United States Patent

Finnegan et al.

[15] 3,701,105

[45] Oct. 24, 1972

[54] CENTRAL PROCESSING UNIT IN WHICH ALL DATA FLOW PASSES THROUGH A SINGLE ARITHMETIC AND LOGIC UNIT

[72] Inventors: Edward D. Finnegan; Leonard Roy Harper, both of San Jose, Calif.; Nicholas S. Mitrofanoff, Rochester, Minn.; Allen C. Slutman, Los Gatos, Calif.

[73] Assignee: International Business Machines Corporation, Armonk, N.Y.

[22] Filed: July 24, 1970

[21] Appl. No.: 57,920

[52] U.S. Cl. ................................................340/172.5
[51] Int. Cl. ................................................G06f 7/00
[58] Field of Search ....................................340/172.5

[56] References Cited

UNITED STATES PATENTS

| | | | |
|---|---|---|---|
| 3,463,910 | 8/1969 | Keslin | 340/172.5 |
| 3,299,261 | 1/1967 | Steigerwalt, Jr. | 340/172.5 |
| 3,550,133 | 12/1970 | King et al. | 340/172.5 |
| 3,439,347 | 4/1969 | Goshorn et al. | 340/172.5 |
| 3,505,648 | 4/1970 | McGovern et al. | 340/172.5 |

*Primary Examiner*—Harvey E. Springborn
*Attorney*—Keith T. Bleuer, Carl W. Laumann, Jr. and J. Jancin, Jr.

[57] ABSTRACT

A central processing unit which includes an arithmetic and logic unit, local store registers and general registers, allows for the use of the arithmetic and logic unit for housekeeping purposes such as address modification during portions of a machine cycle. The processing unit contains no counters or compare circuits other than the single arithmetic and logic unit with all data flow being through the arithmetic and logic unit.

6 Claims, 20 Drawing Figures

INVENTORS
EDWARD D. FINNEGAN, LEONARD ROY HARPER
NICHOLAS S. MITROFANOFF, ALLEN C. SLUTMAN
BY Sughrue, Rothwell, Mion, Zinn & Macpeak
ATTORNEYS

SAR

| OPERATION CODES | | |
|---|---|---|
| 2 - ADDRESS MODE | OP CODE | OP BITS 4 5 6 7 |
| 1) ZERO AND ADD ZONED | X 4 | 0 1 0 0 |
| 2) ADD ZONED DECIMAL | X 6 | 0 1 1 0 |
| 3) SUBTRACT ZONED DECIMAL | X 7 | 0 1 1 1 |
| 4) MOVE HEX - CHARACTER | X 8 | 1 0 0 0 |
| 5) EDIT | X A | 1 0 1 0 |
| 6) INSERT AND TEST CHARACTERS | X B | 1 0 1 1 |
| 7) MOVE CHARACTERS | X C | 1 1 0 0 |
| 8) COMPARE LOGICAL CHARACTERS | X D | 1 1 0 1 |
| 9) ADD LOGICAL CHARACTERS | X E | 1 1 1 0 |
| 10) SUBTRACT LOGICAL CHARACTERS | X F | 1 1 1 1 |
| 1 - ADDRESS MODE | | |
| 1) SENSE I/O | Y 0 | 0 0 0 0 |
| 2) LOAD I/O | Y 1 | 0 0 0 1 |
| 3) STORE REGISTER | Y 4 | 0 1 0 0 |
| 4) LOAD REGISTER | Y 5 | 0 1 0 1 |
| 5) ADD TO REGISTER | Y 6 | 0 1 1 0 |
| 6) TEST BITS ON MASKED | Y 8 | 1 0 0 0 |
| 7) TEST BITS OFF MASKED | Y 9 | 1 0 0 1 |
| 8) SET BITS ON MASKED | Y A | 1 0 1 0 |
| 9) SET BITS OFF MASKED | Y B | 1 0 1 1 |
| 10) MOVE LOGICAL IMMEDIATE | Y C | 1 1 0 0 |
| 11) COMPARE LOGICAL IMMEDIATE | Y D | 1 1 0 1 |
| 12) BRANCH ON CONDITION | Z 0 | 0 0 0 0 |
| 13) TEST I/O AND BRANCH | Z 1 | 0 0 0 1 |
| 14) LOAD ADDRESS | Z 2 | 0 0 1 0 |
| COMMAND MODE | | |
| 1) HALT PROGRAM LEVEL | F 0 | 0 0 0 0 |
| 2) ADVANCE PROGRAM LEVEL | F 1 | 0 0 0 1 |
| 3) JUMP ON CONDITION | F 2 | 0 0 1 0 |
| 4) START I/O | F 3 | 0 0 1 1 |

FIG. 7

| INSTRUCTION FORMAT | OP REF | OP BITS 0-1 FOR FIRST OPERAND ADDRESS | OP BITS 2-3 FOR SECOND OPERAND ADDRESS | FIRST OPERAND ADDRESS | SECOND OPERAND ADDRESS |
|---|---|---|---|---|---|
| | | | 00 | | 2 BYTES DIRECT |
| | | 00 | 01 | 2 BYTES DIRECT | 1 BYTE DISPLACEMENT INDEXED BY XR-1 |
| | | | 10 | | 1 BYTE DISPLACEMENT INDEXED BY XR-2 |
| | | | 00 | | 2 BYTES DIRECT |
| 2 ADDRESS | X | 01 | 01 | 1 BYTE DISPLACEMENT INDEXED BY XR-1 | 1 BYTE DISPLACEMENT INDEXED BY XR-1 |
| | | | 10 | | 1 BYTE DISPLACEMENT INDEXED BY XR-2 |
| | | | 00 | | 2 BYTES DIRECT |
| | | 10 | 01 | 1 BYTE DISPLACEMENT INDEXED BY XR-2 | 1 BYTE DISPLACEMENT INDEXED BY XR-1 |
| | | | 10 | | 1 BYTE DISPLACEMENT INDEXED BY XR-2 |
| | | 00 | | 2 BYTES DIRECT | |
| 1 ADDRESS (NON-BRANCH) | Y | 01 | 11 | 1 BYTE DISPLACEMENT INDEXED BY XR-1 | |
| | | 10 | | 1 BYTE DISPLACEMENT INDEXED BY XR-2 | |
| | | | 00 | | 2 BYTES DIRECT |
| 1 ADDRESS (BRANCH) | Z | 11 | 01 | | 1 BYTE DISPLACEMENT INDEXED BY XR-1 |
| | | | 10 | | 1 BYTE DISPLACEMENT INDEXED BY XR-2 |
| COMMAND | F | 11 | 11 | | |

INSTRUCTION FORMATS AND ADDRESSING MODES

FIG. 8

| MNEMONIC | DEFINITION |
|---|---|
| I-OP | FIRST INSTRUCTION CYCLE - OPERATION CODE OBTAINED FROM STORAGE AND TRANSMITTED TO THE OP REGISTER. |
| I-Q | SECOND INSTRUCTION CYCLE - Q BYTE OBTAINED FROM STORAGE AND TRANSMITTED TO Q-REGISTER AND/OR OTHER DESTINATIONS PER OPERATION CODE. |
| I-R | THIRD INSTRUCTION CYCLE WHEN NOT DEFINED AS ADDRESS BY OPERATION CODE IS ADDITIONAL BYTE OF INFORMATION. |
| I-X1 | ADDRESSING CYCLE OF OPERAND 1 WHERE INDEXING OF FIRST ADDRESS IS REQUIRED. |
| I-H1 | FIRST ADDRESSING CYCLE OF OPERAND 1 WHERE DIRECT ADDRESSING IS INDICATED BY OPERATION CODE. |
| I-L1 | SECOND ADDRESSING CYCLE OF OPERAND 1 WHERE DIRECT ADDRESSING IS INDICATED BY OPERATION CODE. |
| I-X2 | ADDRESSING CYCLE OF OPERAND 2 WHERE INDEXING OF SECOND ADDRESS IS REQUIRED. |
| I-H2 | FIRST ADDRESSING CYCLE OF OPERAND 2 WHERE DIRECT ADDRESSING IS INDICATED BY OPERATION CODE. |
| I-L2 | SECOND ADDRESSING CYCLE OF OPERAND 2 WHERE DIRECT ADDRESSING OF SECOND ADDRESS IS REQUIRED. |
| E-A | OPERAND A CYCLE AS REQUIRED BY OPERATION CODE TO EFFECT EXECUTION OF OPERATION (FETCH OPERAND 2). |
| E-B | OPERAND B CYCLE AS REQUIRED BY OPERATION CODE TO EFFECT EXECUTION OF OPERATION (MODIFY OPERAND 1). |
| I/O | INPUT OUTPUT DATA TRANSFER CYCLE AS REQUIRED BY DEVICE RECEIVING SERVICE. |

FIG. 9

| | | | |
|---|---|---|---|
| XF | L | OPERAND 1 ADDRESS | OPERAND 2 ADDRESS |

CENTRAL PROCESSING UNIT IN WHICH ALL DATA FLOW PASSES THROUGH A SINGLE ARITHMETIC AND LOGIC UNIT

BACKGROUND OF THE INVENTION

1. Field of the Invention

The invention relates to central processing units.

2. Description of the Prior Art

A central processing unit (hereinafter referred to as a CPU) is that part of the computer that consists of control, storage and arithmetic and logic units. Its primary purpose is to interpret program supplied instructions and to execute them. Generally, instructions and data to be acted upon are stored in a main storage, not part of the CPU.

In executing program instructions, portions of the CPU are used to act arithmetically and logically on the data in the main storage. This is accomplished through the use of an arithmetic and logic unit (hereinafter referred to as an ALU).

For proper operation of the computer, the storage locations in the main storage containing the instructions and data must be selectively addressed. Initially, an address is specified by an address field. This field is supplied to address selection circuitry in the CPU which in turn accesses the storage location specified by the address field. To access different storage locations, different address fields must be supplied to the address circuitry. Thus, once a storage location has been accessed, the accessing of other locations is accomplished by incrementing the address selection circuitry or by using a different address field. Prior CPUs utilize counters and compare circuits in addition to the ALU to accomplish this necessary address modification, a housekeeping function. Such circuitry, of course, adds to the complexity and cost of the CPU.

The CPU is used for other housekeeping operations, such as keeping track of the length of a field of data being worked on at any point in time. Prior CPUs accomplished this field length tracking by using counters, in addition to the ALU, again adding to the cost and complexity of the machine. In general, prior CPUs provided for the housekeeping operations by including in the unit a variety of counters and compare circuits in addition to the ALU.

SUMMARY OF THE INVENTION

The CPU of this invention performs the operations of previous CPUs but does so without the use of counters or compare circuits, other than a single arithmetic and logic unit (ALU). The system comprises a single ALU, a group of local store registers, and a group of general registers all interconnected in a unique manner requiring all data flow to pass through the ALU.

The interconnection and operation of the units which make up the CPU will become apparent with the detailed description of the CPU as set out below.

BRIEF DESCRIPTION OF THE DRAWINGS

FIG. 7 is a list of instructions which the CPU can process as well as their corresponding OP codes;

FIG. 8 is a chart showing the instruction formats which may be used with the invention and their binary codes;

FIG. 9 is a list identifying machine cycles which are used to carry out the instructions;

DETAILED DESCRIPTION OF THE PREFERRED EMBODIMENT

Figure 1:
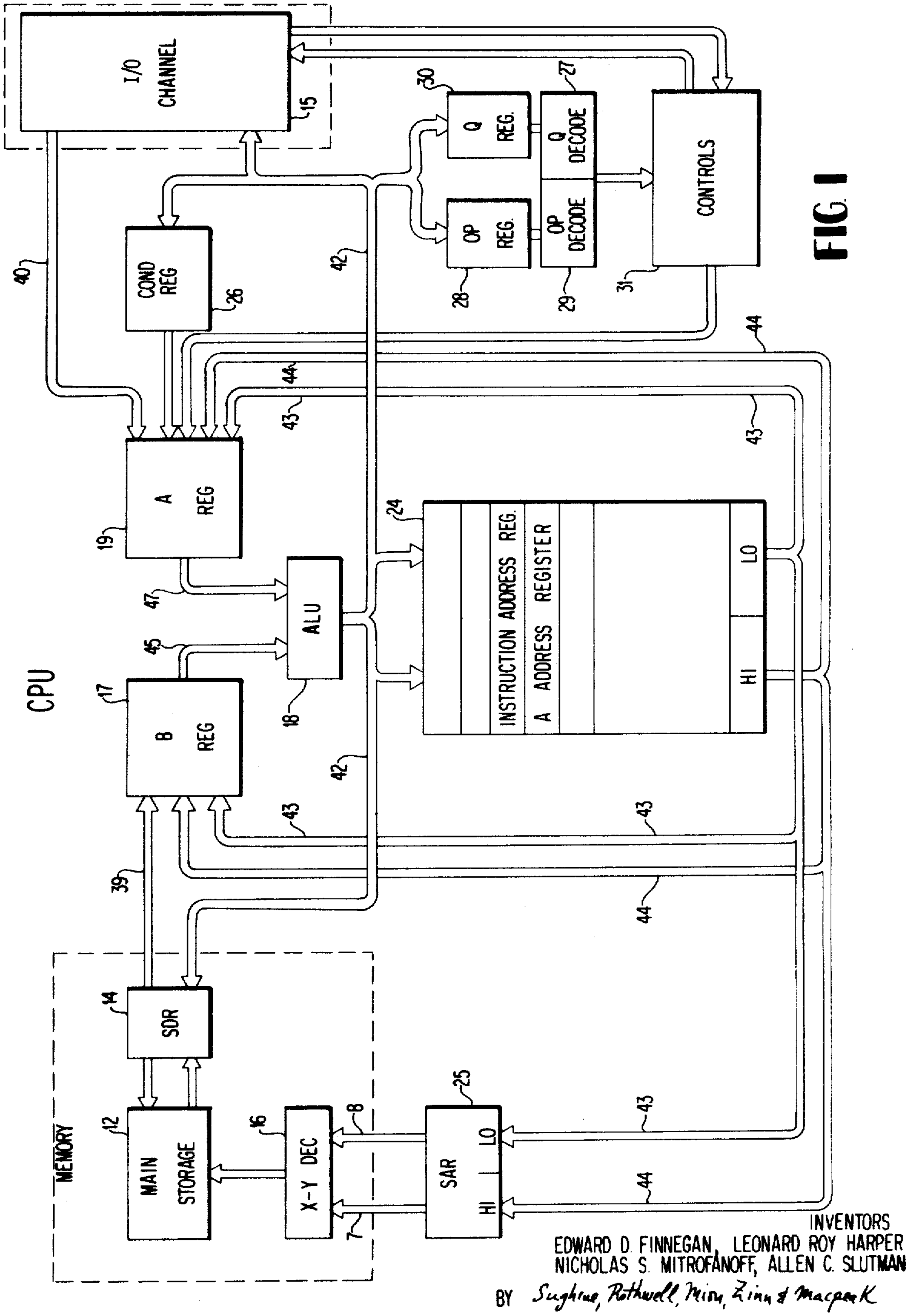
FIG. 1 is a block diagram of the data flow through the CPU.

FIG. 1 shows the elements of the CPU of this invention and the data flow therethrough. The CPU interprets program instructions and directs the processing of the data in accordance with these instructions. The instructions and data are contained in a main storage means 12. The elements, which comprise the CPU are so connected that the retrieved instructions and data pass along the bus 39 through the B register 17, along bus 45, to the ALU 18. It should be noted, at this point, that although instructions and data have been distinguished, an instruction is merely a subset of data, the word data designating any information within the system. When data is used for a control function, it is referred to as instructions. Therefore, for the remainder of this specification, the word data is to be interpreted as meaning any information within the system, while the word instruction as data which is specifically used for control functions. Thus, the word data encompasses the word instruction. In the ALU the data is either modified or passed unchanged to other portions of the CPU, back to the main storage means 12, or to peripheral elements through an input/output channel 15 by way of bus 42. Similarly, data from peripheral units entering the CPU pass through the input/output channel 15 to the A register 19 and then, by way of bus 47, to the ALU 18. The information is either modified by or passed through the ALU 18 and channelled to other portions of the CPU, to the main storage 12 or back to the peripheral units through channel 15 by way of bus 42.

In the preferred embodiment of the invention data flows in the CPU in the form of a data byte consisting of eight bits of information plus a parity bit. Thus, buses 39, 40, 42, 43, 44, 45 and 47 each represent nine lines. The information proceeds serially by byte through the ALU and is distributed to the remaining sections of the machine from the ALU output. The ALU receives data from the A register 19 and from the B register 17.

Internally, the CPU distributes the ALU output to an OP register 28 and a Q register 30 for instruction decoding, a CONDITION register 26 which contains testable program indicators and local store registers (LSR) 24, used as address registers and also for interim storage of data.

CPU Machine Cycle

Figure 2:
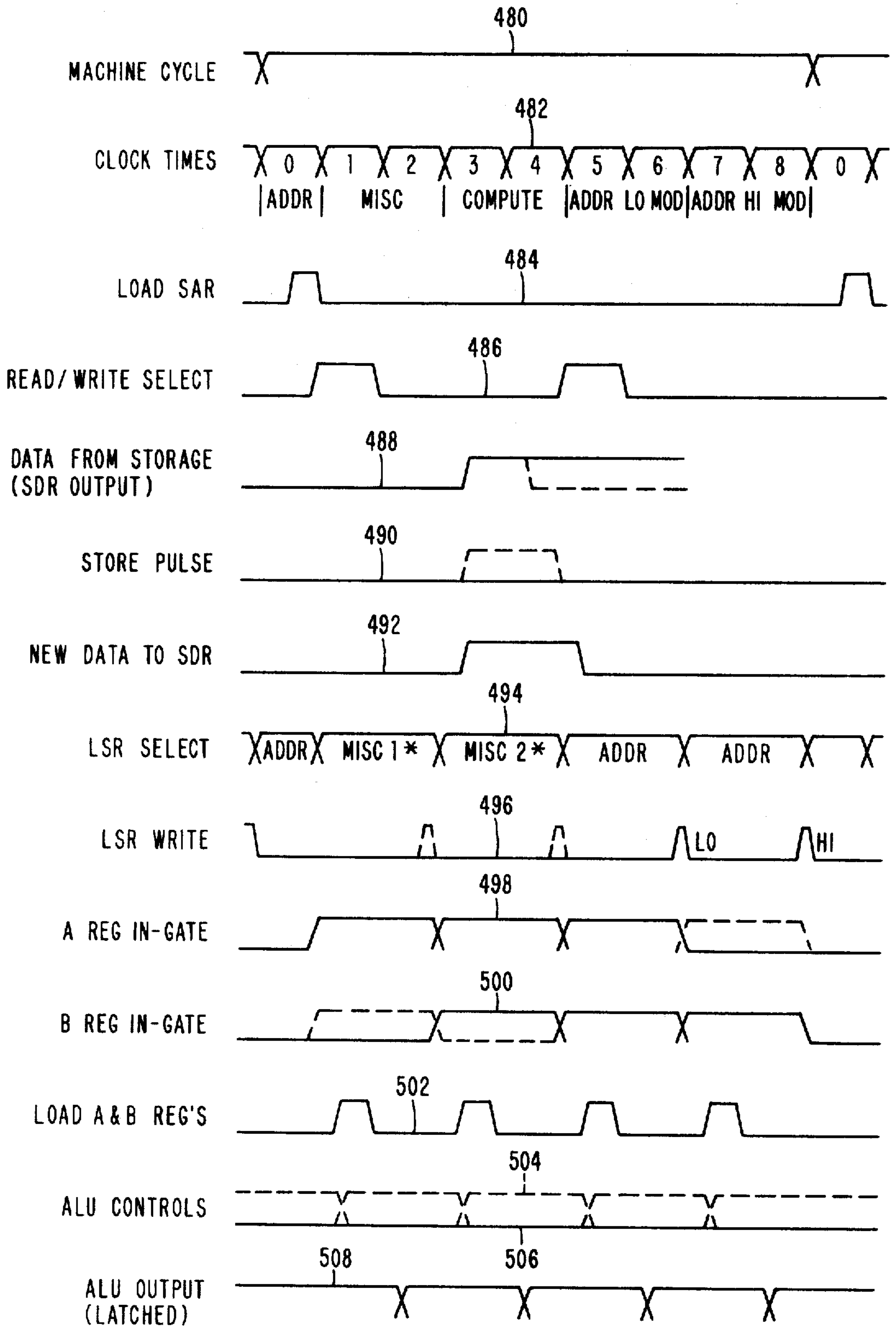
FIG. 2 is a timing diagram of a CPU machine cycle used with the CPU of this invention and the portions during the cycle alotted to the various CPU operations.

In the preferred embodiment of the invention, the CPU machine cycle is as shown in FIG. 2. The cycle is divided into nine clock times, 0 through 8. The duration of a machine cycle is based on the speed of the main storage 12 because the CPU must command a read from and a write into the main storage during each machine cycle. The CPU control logic sends the read and write pulses to the main storage 12 during clock times 1 and 5 respectively. This is shown diagrammatically in FIG. 2 by the read and write timing lines. During clock times 3 and 4, the data, retrieved from the main storage 12, is acted upon in the ALU. Thus, during clock times 0 through 2 and 5 through 8, the ALU is free to be used for housekeeping operations.

As shown in FIG. 2 the machine cycle is divided into five functional time periods. The first functional time period is the ADDRESS time and begins at the rise of time clock 0 and ends at its decay. During time clock 0 the contents of a selected local store register 24 are transferred to the storage address register 25 via buses 43 and 44 for the purpose of addressing the main storage 12.

The second functional time, called MISCELLANEOUS , begins at the rise of time clock 1 and ends at the decay of time clock 2. During this time, under the control of a program instruction the CPU orders the retrieval and storage in register 14 of the contents in the storage location of storage 12 accessed during clock time 0. Thus, during this time period, the CPU, if it is so instructed, has time to process the contents of the A and B registers through the ALU. The actual contents of the A and B registers during clock times 1 and 2 are determined by the purpose of the machine cycle and, as the name of the functional time period implies, there is no specific function which must be accomplished during this time.

The third functional time, called COMPUTE begins at the rise of clock time 3 and ends at the decay of clock time 4. During this time period, the contents of the addressed location in main storage 12 is available to the CPU in the storage data register 14. The contents of the register 14 may then be sent to the B register. It is during this time period that the contents of the B register, which is the contents of the addressed storage location, may be processed through the ALU and there modified by the contents of the A register. The A register may be loaded with a zero content if the contents of the B register 17 is to be flushed through the ALU without modification. The contents of the B register whether it is modified or not by the contents of the A register becomes available at the output of the ALU for transfer back into register 14 via bus 42 for storage in storage 12 at the end of this time period. In addition, this functional time period may be used to flush data from the channel 15 through the A register and the ALU to the register 14 if the contents of the B register is set to zero. As with the MISCELLANEOUS time period the COMPUTE time is not limited to any one specific operation.

The fourth and fifth functional time periods, called ADDRESS LOW MOD and ADDRESS HI MOD, occur during the fifth and sixth and seventh and eighth clock times respectively. During the ADDRESS LO MOD time period half (denoted the LO half) of the selected address register, the register being selected during the first functional time period, is gated into the B register 17 via bus 43 and then to the ALU to be modified by the contents of the A register 19. Each of the local store registers is 18 bits wide. Therefore, modification of the entire contents must be done in two parts. The ADDRESS HI MOD time period is used to modify the address in the second half that is the HI half of the selected local store address register.

In the CPU described herein, a separate machine cycle is required to process each instruction or data byte. The cycles may be broadly classified into two groups, instruction cycles, used to develop the machine instructions and execution cycles, required for the execution of the instructions. A further description of these cycles is included hereinafter.

The General Registers

The storage address register (SAR) 25 is used to address the main storage 12. This register is an 18-bit register which receives two address bytes from address registers contained in the local store registers 24. In a manner well known, each eight-bit address byte is accompanied by a parity bit.

Figure 3:
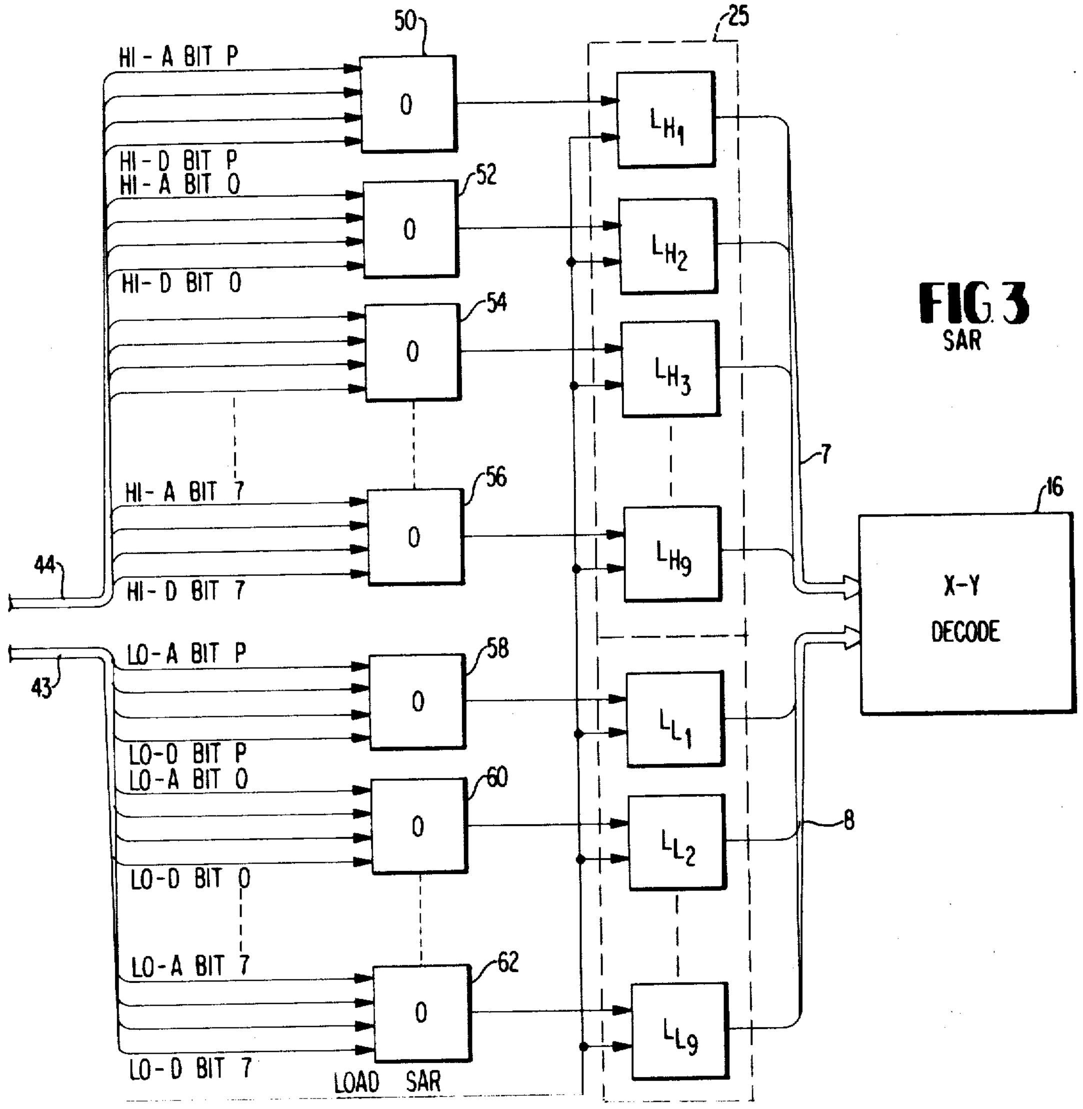
FIG. 3 shows the storage address register and its associated logic for accepting inputs from the local store registers.

The register 25, is shown in detail in FIG. 3 and consists of 18 latches, LH1–LH9 and LL1–LL9. These registers are polarity holds also known as C/D flip-flops. A polarity hold is a normal latch whose set or data side overrides the reset or control side. Such devices are well known in the art. During those times when the LOAD SAR line coupled to the input of the control side of a polarity hold is raised to a logic one, the output follows the polarity of the set side since it is dominant. When a pulse on the LOAD SAR line drops, the control input also drops and the set side of the latch remains set to a logic 1. If on the occurrence of a pulse on the LOAD SAR line, the set input is at a logic 0, the polarity hold output will appears as a logic zero.

Figure 15:
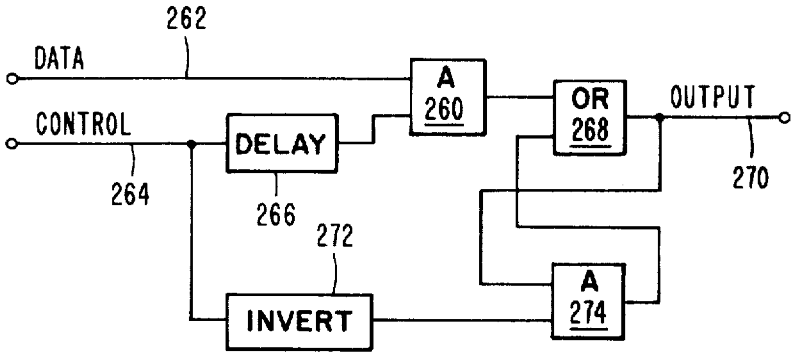
FIG. 15 is a diagrammatic illustration of a polarity hold latch.

As a polarity hold latch is illustrated diagrammically in FIG. 15, it may be seen to comprise an AND circuit 260 having a data line 262 as an input. The polarity hold also has a control line 264 as an input, and this line is connected to a delay circuit 266 having its output as a second input to the AND circuit 260. An OR circuit 268 has the output of the AND circuit 260 as an input and has an output 270 which also constitutes the output of the polarity hold. An invert circuit 272 has the control lead 264 as an input and has its output as one of the two inputs of an AND circuit 274. The second input of the AND circuit 274 is the output lead 270, and the output of the AND circuit 274 constitutes the second input to the OR circuit 268.

Figure 16:
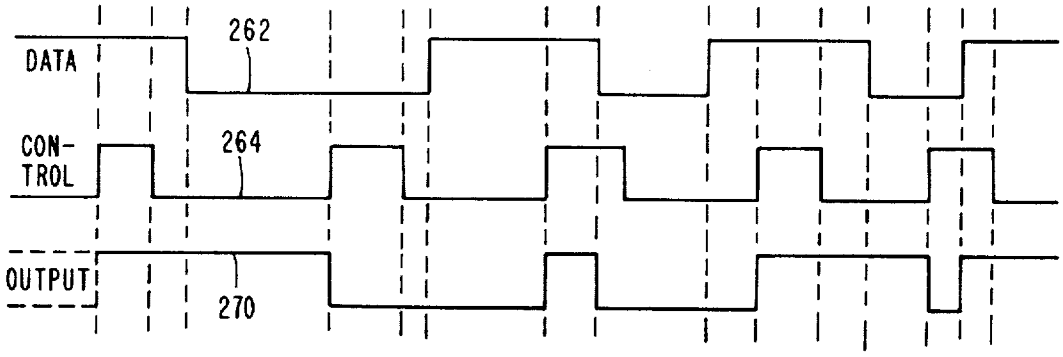
FIG. 16 is a diagram showing the signals that occur in various portions of a polarity hold latch.

As will be observed from FIG. 16, the output lead 270 has a logical +1 signal on it whenever +1 signals exist on both the data lead 262 and the control lead 264. This is due to the fact that logical +1 signals on leads 262 and 264 satisfy the AND circuit 260 which in turn produces a logical +1 signal on the output lead 270 through the OR circuit 268. When the signal on the control lead 264 subsequently goes to zero, the output signal on lead 270 still remains, since, under these conditions, AND circuit 274 is satisfied from the output of the invert circuit 272 and by the logical +1 output signal on the lead 270. When the signal on the data lead 262 becomes zero, the output signal on lead 270 nevertheless remains up due to the action of the AND circuit 274, but the output signal becomes zero when the control signal on lead 64 subsequently goes to a logical +1 value, since, under these conditions, the AND circuit 274 will not be satisfied. The purpose of the delay circuit 266 is to prevent a race condition under the condition in which the control signal on lead 264 goes to zero with the output of the invert circuit 272 applied to the AND circuit 274 going to logical +1. Under these conditions, the delay circuit 266 assures that the AND circuit 260 remains satisfied for a moment after the control signal goes to zero, so that the signal on the output lead 270 remains up for a moment after the output of the invert circuit 272 goes to +1 and so that the AND circuit 274 remains satisfied. Thus, a change in signal level on the control lead 264 from logical +1 to 0 has no effect in changing the output signal on lead 270.

The pulse on the LOAD SAR line is derived from the clock controls contained in the control logic 31. As is well known, controls 31 contain a master clock and logic circuitry for combining clock, instruction and execution signals and for passing these signals at the selected times to the various components of the CPU.

The controls 31 control the passage of data throughout the central processing unit, and description of the controls 31 will be given in connection with FIG. 2. The curve 480 entitled "machine cycle" illustrates the basic time for handling one byte of data from storage 12, and the machine cycle is divided into the nine clock times as shown by the "clock" curve 482.

At the very beginning of the machine cycle 480, on the rise of clock time zero shown in curve 482, the central processing unit starts to select a local store register 24 so as to find an address with which data may be fetched from storage 12. This is indicated by the designation "ADDR" on curve 482. As soon as this address has been determined, a local store register 24 has thus been selected, and the "load SAR" curve 484 rises. The "load SAR" pulse on curve 484 causes the transfer of the content of the selected local store register 24 to the storage address register 25 which thereby contains the address of the set of data in storage 12 on which work is to be done. After this address has been loaded into SAR 25, a read call is sent to storage 12 which is the first of the two pulses appearing on the graph 486. This constitutes a signal to storage 12 that an address has been established in the SAR 25 and that the system has been directed to fetch the corresponding data from storage 12.

Graph 488 entitled "Data from Storage (SDR output)" indicates the approximate time at which this data flows out of storage 12, and the period of time from the beginning of the cycle (when clock time zero rises) to the rise of the signal on graph 488 is fixed by the attributes of storage 12. Graph 488 shows a dropoff in dotted line under clock time 4, and this represents the fact that the data fetched from storage 12 may be left in the storage data register 14 or that the CPU may destroy the data in favor of sending new data into storage 12. The latter is accomplished by a "store pulse" shown by graph 490. The pulse on graph 490 is dotted also, indicating that new data is not always sent to storage 12 but rather sometimes the controls are effective to regenerate back into storage 12 the data that has been fetched from storage 12. Basically, the "store pulse" curve is actually a concept, rather than constituting an actual pulse anywhere in the system, and indicates simply that the controls 31 direct that the data just read from storage 12 may be destroyed and that storage 12 must be ready to accept new data that will be furnished. This concept is implemented by considering the second of the two pulses appearing on the "read/write select" graph 486 which is recognized by storage 12 as a "write" pulse; and overlapping this "write" pulse with the pulse shown on the "new data to SDR" graph 492. With the overlap of these two pulses, the storage data register 14 is reset; and, the data that was in SDR 14 and which has just come from storage 12 is wiped out. The new data, which is presently available to storage 12 on the ALU output bus 42 connected to the storage data register 14, is put into SDR 14 in place of the old data that was there; and, at this point, the new data is written into storage 12.

The "LSR select" graph 494 shows the various local store register 24 select times under the control of controls 41. The first portion of graph 494 labeled "ADDR" has already been described, this being address selection in connection with a local store register 24 from which an address is determined in storage 12 to obtain data or an instruction from storage 12.

The second select time shown on graph 494 labeled "MISC 1" is used for several different purposes, for a length count modification factor, for example. The portion of the graph 494 labeled "MISC 2" has a number of possible uses. One of these uses is in connection with a fetch of data being made from storage 12 with the data being routed into a data recall local store register 24. On a following cycle, another piece of data from storage 12 is utilized and this data is to be added to, subtracted from or have some other operation done on it by ALU 18. One byte only has been fetched from storage 12 at a time, and one of the bytes has been stored in a local store register 24 (the data recall register) and during clock times 3 and 4 in the "MISC 2" portion of graph 494, the data is brought back out of the data recall local store register 24 to meet the other byte of data drawn from storage 12 in the ALU 18 so that the data modification just mentioned may be made. Clock times 3 and 4 shown in graph 482 are thus referred to as "compute time"; and during this time, data from storage 12 is available for this modification.

As is indicated by both curves 482 and 494, address modification takes place between clock times 5 and 6; and, during this time there is a mandatory selection of a local store register 24 and the low half of the address contained in a local store register 24 is modified. A full address of a piece of data in storage 12 is 16 bits or 2 bytes wide (not mentioning parity). The low half of the address is modified at this time by putting the address contained in the lower portion of a local store register 24 into the B register 17 and by putting the appropriate modification factor into the A register 19, so that the ALU 18 can operate on these addresses.

Under the action of the controls 31, during clock times 7 and 8 and as indicated by graphs 482 and 494, the same address register is selected; and, at this time, the high half of the register is modified in content in the same manner as just discussed. Generally, at this time, there is no modification factor in the A register 19 except that any carry that resulted from the previous modification during clock times 5 and 6 has been saved as an input to the ALU from the A register 19 during clock times 7 and 8.

Referring still further to FIG. 2, the graph 496 entitled "LSR write" indicates the various times during which the controls 31 may act to modify the contents of or write data into the local store registers 24 and during which these registers receive their data from the output of the ALU 18 as shown in FIG. 1. Since the local store registers 24 are 16 bit registers (18 bits if the two parity bits are counted) modification of the content of these registers must be done in two halves, low and high. The dotted pulses in curve 496 approximately at the end of clock time 2 and at the end of clock time 4 indicate that at these times there may be either a write HI LSR or a write LO LSR pulse or that indeed there may be no such pulses at all. .Whether or not these particular pulses exist depend on the instruction being processed and what function the CPU is doing at the time. The LSR write LO pulse occurring approximately at the end of clock time 6 is an always present pulse which causes the writing into an LSR 24 of the low half of the address which has just been modified. At clock time 8, the LSR high pulse has the same function for the high half of the address that has just been modified.

Curve 498 represents the times when the controls 31 functions to supply data into the A register 19. The dotted portion of the curve 498 indicates that data need not always be supplied to the A register 19 during clock times 7 and 8 in which the dotted portion of curve 498 occurs. During the first signal portion of curve 498 in clock times 1 and 2, the controls 31 cause the A register 19 to be loaded with a modification factor, such as for example, for length count modification. During clock times 3 and 4, the A register 19 may be loaded as shown by curve 498 with, for example, data that has been temporarily saved in the data recall local store register 54. This time may also be utilized to send data to the A register 19 from the I/O bus 40 if this is an I/O cycle. The In-gate of the A register 19 is opened during clock times 5 and 6, according to curve 498, to provide a modification factor therein for an address that is being modified. During clock times 7 and 8, the A register In-gate may be opened to provide a modification factor in the A register 19 that is being sent from an I/O device during an I/O cycle.

The controls 31 also cause gating of data into the B register 17, this being in accordance with curve 500 entitled "B REG In-Gate". The dotted lines in this case also indicate that the B register 17 may not be gated at the times indicated by the dotted lines. During clock times 1 and 2, the data supplied to the B register 17 under control of the controls 31 would likely be the contents of a local store register 24 used for length count modification or it may be also the contents of the condition register 26 used if this is a cycle in which the condition of the register 26 is being updated or modified. During clock times 3 and 4, the B register may be loaded with data from the SDR 14, this being data from storage 12. The dotted line during this time period indicates that data from storage 12 may be ignored, such as for example, when new data is being moved into some location in storage 12 and there is no need to utilize the old data in storage 12. During clock times 5 and 6 and also during clock times 7 and 8, the controls 31 provide address modification and send in an address to the B register 17. Previously, as has been mentioned, an address modification factor is sent to the A register 19 at these times.

The curve 502 entitled "Load A and B REGS" merely indicates the timing of the pulses derived from controls 31 that puts data into the A register 19 or B register 17.

Curves 504 and 506 entitled "ALU controls" merely indicate, particularly when dotted, that the ALU controls are not fixed and that during any one of the subcycles, different ALU functions for modifying data, such as AND, OR, AND and OR together, flush through or subtract, may occur. The curves 504 and 506 are therefore represented as being either up or down flexibly, and ALU 18 is under the control of the controls 31 which is aware of the particular function that is being performed by the CPU.

The curve 508 entitled "ALU output (latched)" represents the output register of the ALU 18, this being the right-most register entitled "ALU LATCHED" in FIG. 7 of Mitrofanoff U.S. Pat. No. 3,596,074 hereinafter referred to more specifically. This output register of the ALU 18 contains data when the curve 508 is in its up condition.

To briefly recapitulate, controls 31, during clock zero time causes the selection of a local store register 24 to obtain an address to be sent to the storage address register 25. Clock times 1 and 2 constitute a time period sufficient to exercise the ALU 18 and to modify one byte of data in the "MISC 1" time shown in graph 494, clock times 1 and 2 being generally used for such operations as modifying length count and modifying the content of condition register 26. Clock times 3 and 4 is a period referred to as compute time; and, during this period, the data from storage 12, this being at the address addressed at clock time zero, is now available. After action by the ALU 18, the resulting data is sent to its ultimate destination, such as the A register 19, storage 12, a local store 24 (the data recall register), op register 28, or some other ultimate destination. Regardless of whichever cycle the central processing unit is operating in, another address will be required on the next cycle; and, therefore, the original address in the particular local store register 24 being considered must be modified. During clock times 5 and 6, the low half of the address in this local store register is modified; one-half of an address of 16 bits is modified at a time, since the CPU provides only a one-byte data path throughout. Any resultant carry from this modification of the low half of the address will be saved, and this carry will be added into the high half of the address which is modified at clock times 7 and 8. Clock time 8 completes one machine cycle; and the CPU starts over again at the next clock zero, again selecting a new address in storage 12 for this next cycle.

The data from a selected LSR register is transferred via buses 43 and 44 through OR gates 50, 52, 54, 56, 58, 60 and 62 to the register 25 and sets the selected latches LH 1 through LH 9 and LL 1 through LL 9 in accordance with the information in the two address bytes. In a manner well known, these address bytes are transferred through buses 7 and 8 to an XY decoder 16 which decodes the address information to select a storage location in the main storage 12.

After the address of a storage location is stored in register 25, a read pulse is initiated at clock time 1. This pulse is generated by the control circuitry 31 to signal the memory 12 that an address is contained in the register 25 and that the contents of the addressed location should be retrieved.

Due to the speed of the storage 12, data is not available for entering into the B register until clock time 3. Therefore, the ALU can act when needed on additional data.

Figure 4:
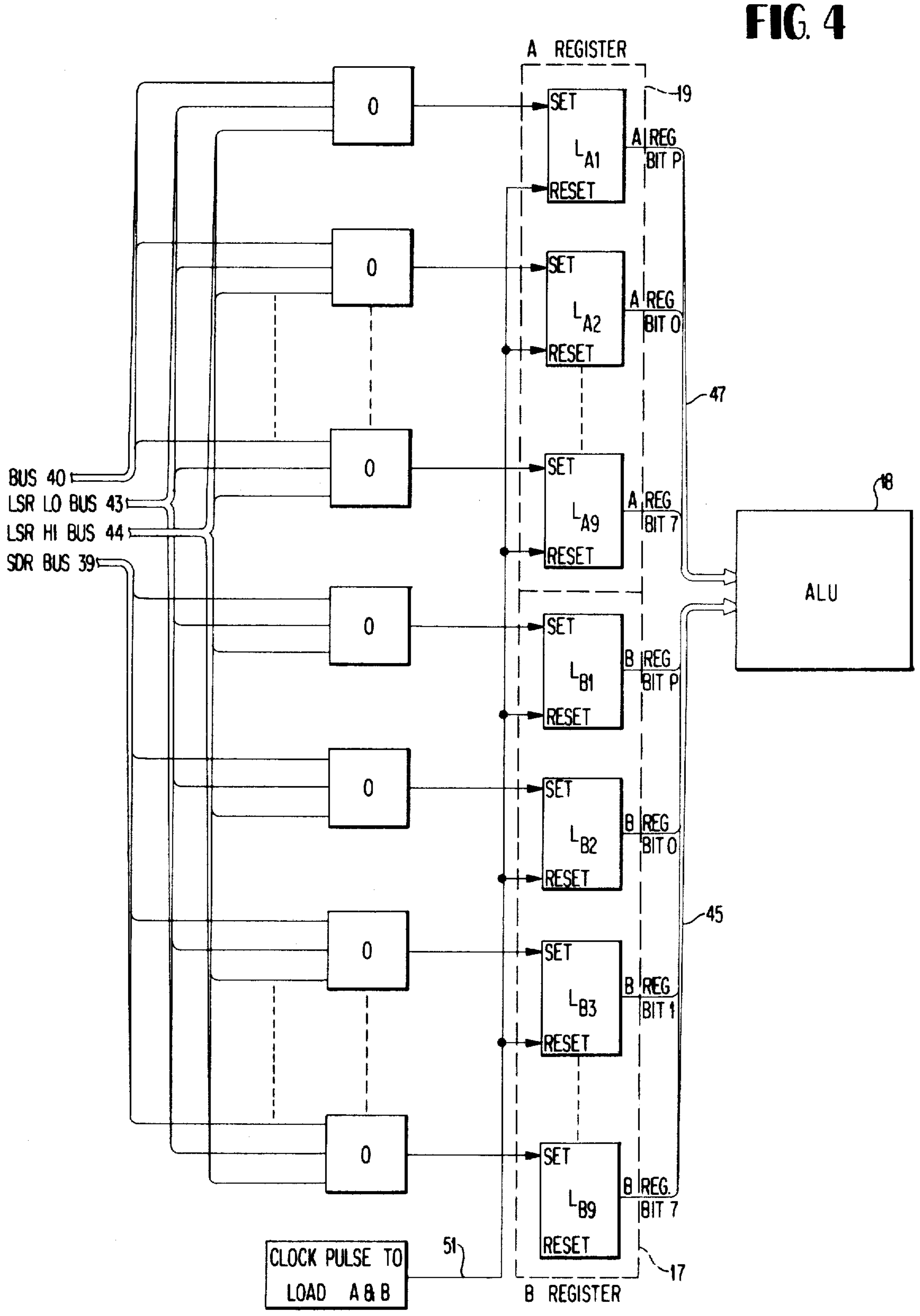
FIG. 4 shows the A register and B register of this invention and the input and output buses thereto.

FIG. 4 shows the details of the A and B registers and their associated logic for transferring the data on buses 39, 40 43 and 44 through the A and B registers to the ALU. Additional inputs to the A register from the CONDITION register 26 and controls section 31 are not shown. The A register 19 is a nine-bit register and as previously disclosed may be used to store data to modify the contents of the B register. The modifying data contained in the A register is derived from various sources, including the contents of a selected local store register 24, the contents of the condition register 26, data from the control section 31 and data from peripheral apparatus through the input/output channel 15. The A register is so positioned in the data flow pattern that all data entering the CPU from the channel 15 must pass therethrough. The contents of the A register is passed unmodified through the ALU when the B register is loaded with a 0 content. The B register is effectively loaded with 0 content, by blocking the data on bus 39 from entering the B register. Thus all data from the peripheral apparatus must pass through the ALU 18.

The B register 17 serves as a nine-bit wide buffer for all the information bytes that ought to be modified in the ALU by the contents of the A register. This includes those situations where the A register is loaded with a 0 content. When such be the case, the contents of the B register is passed unmodified through the ALU.

The A and B registers each consist of nine latches in the form of polarity holds. The timing of the registers is controlled by the control circuitry 31 and at program specified times the line 51 is raised to selectively set latches LA1 through LA9 and LB1 through LB9. Timing of the raising of line 51 is shown diagrammatically in the timing diagram of FIG. 2 by the LOAD A and B REGS line.

As previously disclosed, bus 40 carries data and instruction bytes to the A register from the input/output channel 15. Bus 39 carries the contents of register 14 to the B register. The LSR LO bus 43 and the LSR HI bus 44 carry data from the LSR 24 to both the A and B registers. The outputs of the set sides of the latches of the B register are coupled to bus 45 while the outputs to the set sides of the latches of the A register are coupled to the bus 47. Buses 45 and 47 are used to transfer the contents of the A and B registers to the arithmetic and logic unit 18.

Figure 18:
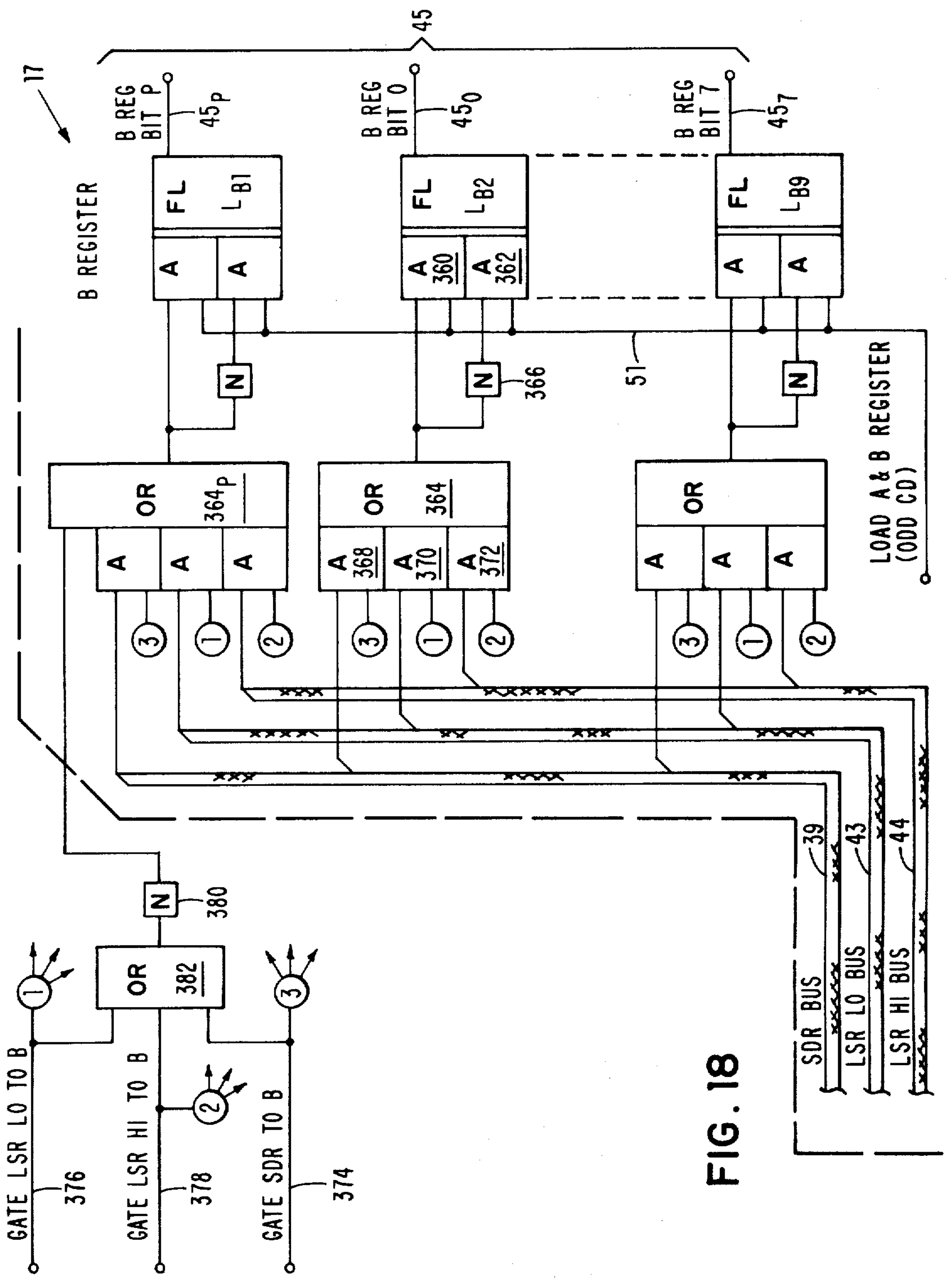
FIG. 18 is a diagrammatic showing of the B register of the processing unit together with control logic for the register.

The B register together with its controlling logic, is shown in some detail in FIG. 18. Referring to this figure, the latch $L_{B2}$, which is one of the nine latches of the B register, may be seen to have an AND circuit 360 on its set side and an AND circuit 362 on its reset side. The latch $L_{B2}$, produces the output signal "B register bit 0" on its output line $45_0$ which is one of the leads in the bus 45. Each of the AND circuits 360 and 362 has the lead 51 carrying the control signal "Load A and B Register" applied to it, and the AND circuit 360 has the output of an OR circuit 364 as an input. An inverter circuit 366 is connected between the output of the OR circuit 364 and the AND circuit 362 as shown.

Three AND circuits 368, 370 and 372 are appended onto the OR circuit 364, and the AND circuits 368, 370 and 372 respectively, have the bit zero leads in the buses 39, 43 and 44 as inputs. The AND circuit 368 also has an input from a lead 374 carrying the signal "-Gate SDR To B"; the AND circuit 370 also has an input from a lead 376 carrying the signal "Gate LSR LO To B"; and the AND circuit 372 also has an input from a lead 378 carrying the signal "Gate LSR HI To B".

The other latches in the B register including the latches $L_{B1}$and $L_{B9}$, which are specifically illustrated, each have an OR circuit corresponding to the circuit 364 with AND circuits corresponding to the circuits 368, 370 and 372 supplying signals to it. These corresponding AND circuits are fed from the buses 39, 43, and 44 and particularly from the corresponding bit leads in these buses.

The OR circuit $364_P$, which is for the latch $L_{B1}$ and which corresponds to the OR circuit 364, has an additional input, and this additional input is from an inverter circuit 380 which has the output of an OR circuit 382 applied to it.

Signals respectively appear on the lines 376, 378 and 374, which constitute control lines, when gating of bytes to the B register should occur from the low portion of a local store register 24, the high portion of a local store register or from the storage data register 14. At these times, the appropriate bits from the SDR bus 39, the LSR low bus 43 or the LSR high bus 44 are gated through the AND circuits 368, 370 and 372 and the corresponding AND circuits for the other bits so as to set the appropriate ones of the latches $L_{B1}$ to $L_{B9}$. The line 51 functions as the control for the latches $L_{B1}$ to $L_{B9}$, which are polarity hold latches as previously mentioned.

Figure 19:
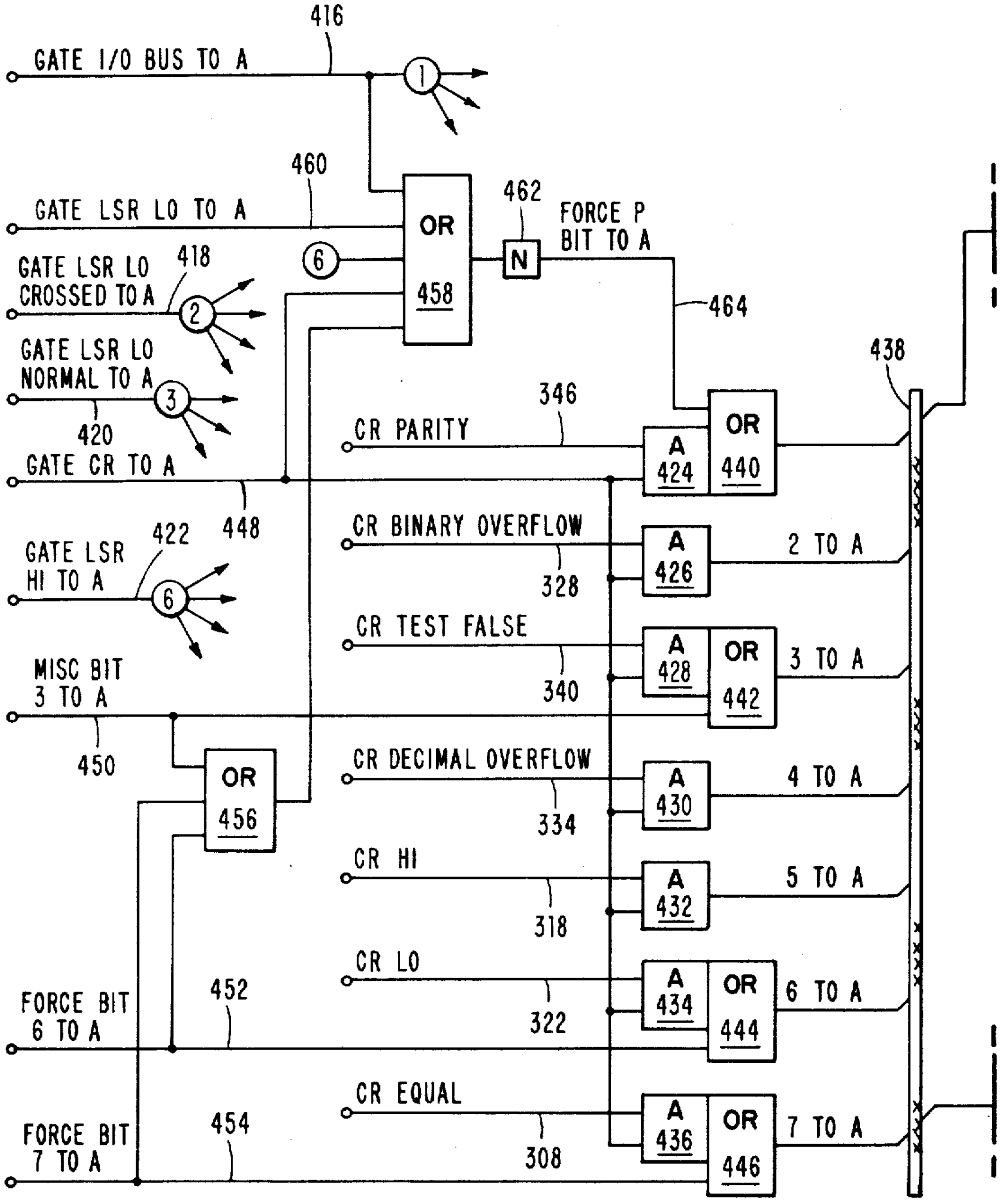
FIGS. 19 and 20, when placed together with FIG. 19 on the left and FIG. 20 on the right, constitute a diagrammatic illustration of the A register of the processing unit together with controlling logic.
Figure 20:
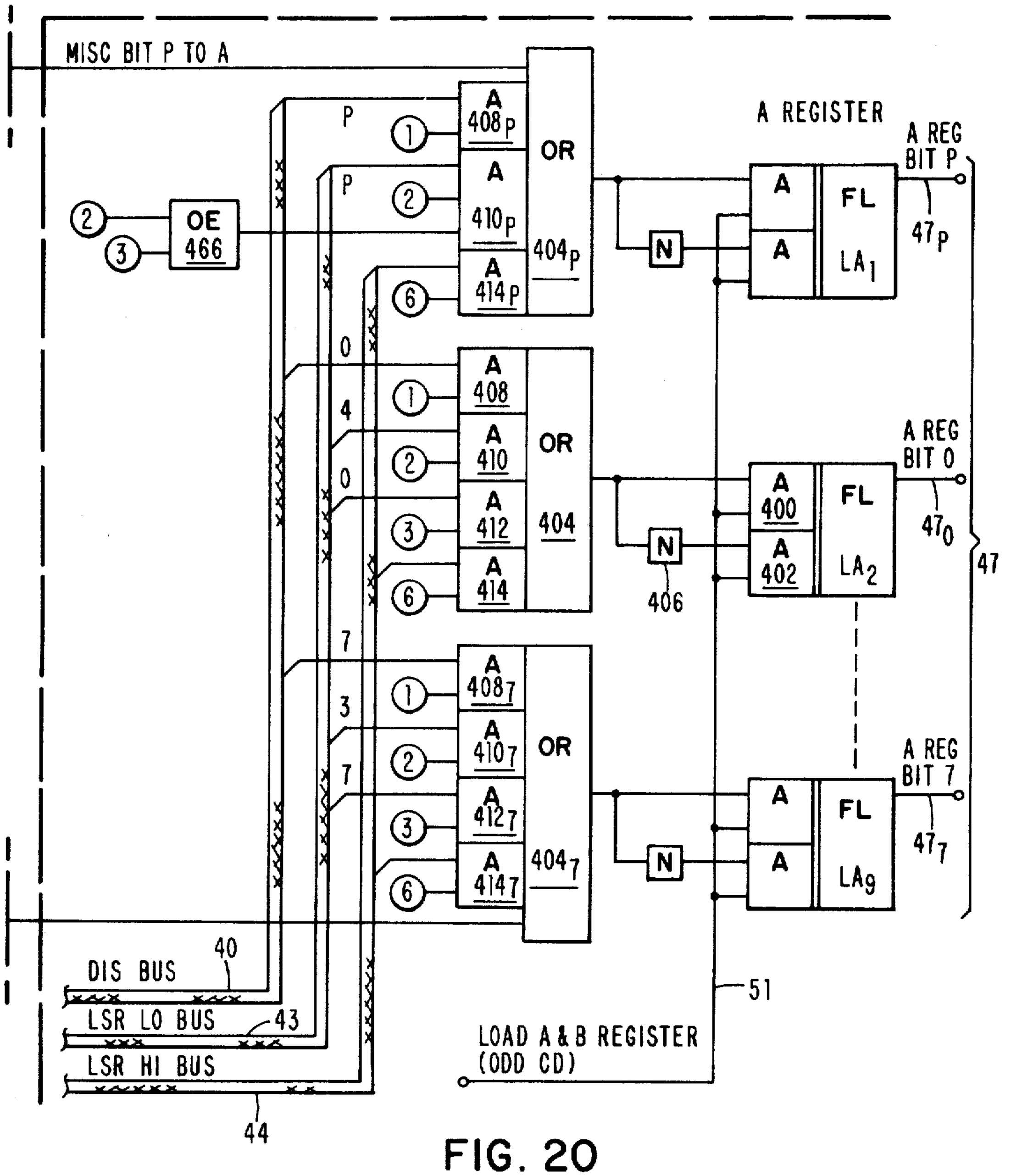

Referring to FIGS. 19 and 20, three of the nine latches $L_{A1}$ to $L_{A9}$ of the A register 19 are illustrated; and these respectively have the leads $47_P$, $47_O$, and $47_7$ as outputs, these being part of the bus 47. The latch $L_{A2}$ has AND circuits 400 and 402 appended to it on its set and reset sides respectively. One input to the AND circuit 400 is the output of an OR circuit 404, and an inverter circuit 406 is disposed between the output of the OR circuit 404 and the other AND circuit 402. AND circuits 408, 410, 412 and 414 are appended onto the OR CIRCUIT 402. The AND circuits 408, 410, 412 and 414 respectively have the bit zero lead in the bus 40, the bit four lead in bus 43, the bit zero lead in bus 43, and the bit zero lead in bus 44 as inputs. In addition, the AND circuits 408, 410, 412, and 414 respectively have the leads 416, 418, 420 and 422 as inputs. These leads respectively carry the signals "Gate I/O Bus To A", "Gate LSR LO Crossed To A", "Gate LSR LO Normal To A", and "Gate LSR HI To A".

As illustrated, each of the other latches in the A register has an OR circuit corresponding to the OR circuit 404 as an input, the OR circuit $404_P$ constituting the OR circuit for the latch $L_{A1}$ and the OR circuit $404_7$ constituting the OR circuit for the latch $L_{A9}$. In addition, and circuits corresponding to AND circuits 408, 410, 412 and 416 are provided for bit positions 1–7; and AND circuits $408_p$, $410_p$ and $414_p$ are provided for the parity bit position.

Figure 17:
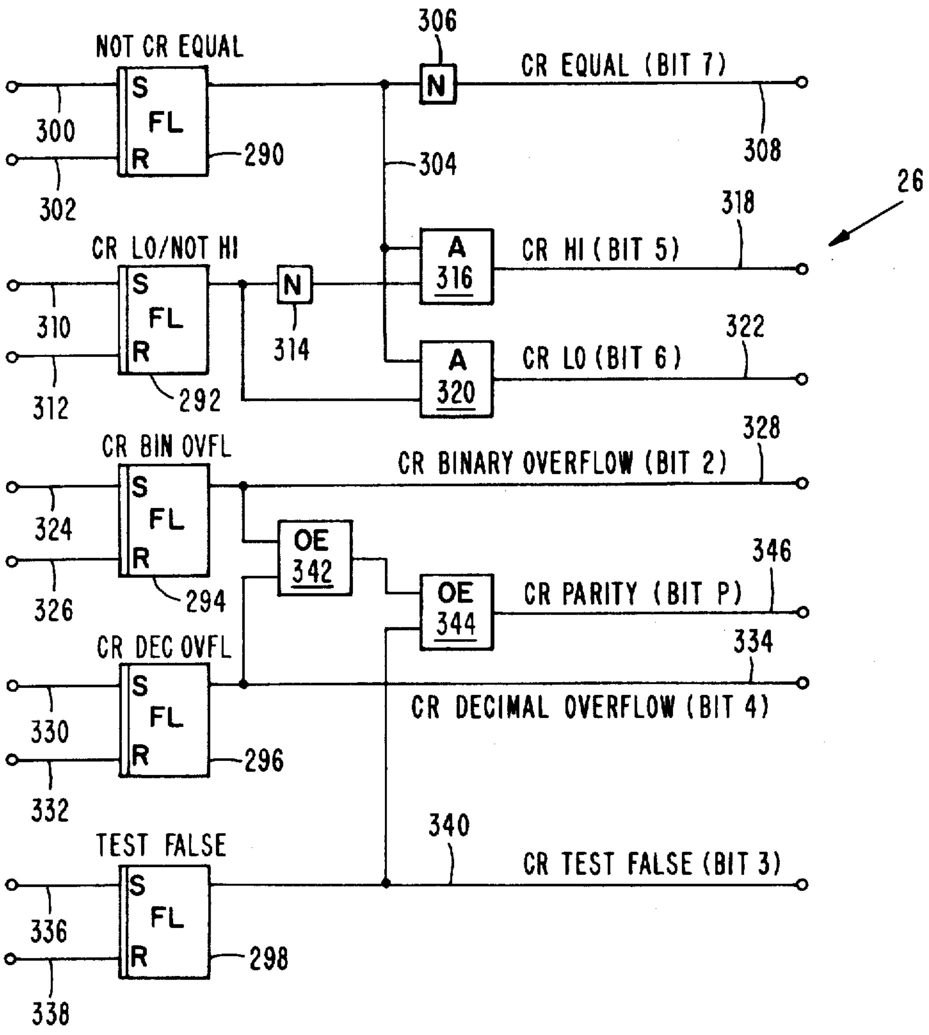
FIG. 17 is a diagrammatic illustration of the condition register in the processing unit.

AND circuits 424, 426, 428, 430, 432, 434, and 436 are connected to the outputs of the condition register 26, this being by leads 346, 328, 340, 334, 318, 322, and 308 carrying the signals indicated in both FIGS. 17 and 19. The AND circuits 426, 430, and 432 are connected directly to a bus 438; and OR circuits 440, 442, 444 and 446 are interposed between the AND circuits 424, 428, 434, and 436 and the bus 438, as shown. The AND circuits 424, 426, 428, 430, 432, 434 and 436, in addition to having the outputs of the condition register 26 as inputs, have the lead 448 as inputs, this lead carrying the signal "Gate CR to A". The OR circuit 442 has the lead 450 as an input; the OR circuit 444 has the lead 452 as an input; and the OR circuit 446 has the lead 454 as an input; these leads 450, 452, and 454 respectively carrying the signals "Miscellaneous Bit 3 To A", "Force Bit 6 To A", and "Force Bit 7 To A".

The OR circuit $404_p$ has connections to it differing somewhat from the connections to the other corresponding OR circuits. In this connection, an OR circuit 456 is provided having the leads 450, 452, and 454 as inputs. An OR circuit 458 has the output of the OR circuit 456 as an input and in addition has the lead 416, a lead 460, the lead 448, and the lead 422 as inputs. The lead 460 carries the signal "Gate LSR LO To A". The output of the OR circuit 458 is applied to an inverter circuit 462 which provides the signal on its output lead 464 of "Force P Bit To A", and the lead 464 is connected as an input to the OR circuit 440. An exclusive OR circuit 466 has its output connected with the AND circuit $412_p$ which also has the lead 418 as an input; and circuit 446 has leads 418 and 420 as inputs.

The output of the OR circuit 440 is applied to the bus 438 and flows through the bus as the signal "Miscellaneous Bit P to A" and is applied directly onto the OR circuit $404_p$. The output of the OR circuit 446 is the signal "7 to A" indicating that this is bit 7 being applied to the A register 19, and this signal flows through the bus 438 for direct application onto the OR circuit $404_7$. Although the OR circuits $404_1$ to $404_6$ are not shown, likewise the 2, 3, 4, 5, and 6 bits constituting the outputs respectively of the circuits 426, 442, 430, 432 and 444 are applied through the bus 438 directly onto the OR circuits that correspond with the OR circuit 404, in the same manner as the outputs of the circuits 440 and 446 are applied directly onto the corresponding OR circuits $404_p$ and $404_7$.

The zero bits respectively from buses 40, 43 and 44 are applied onto the AND circuits 408, 412 and 414. Likewise, the 7 bits from the buses 40, 43 and 44 are supplied directly onto the corresponding AND circuits $408_7$, $412_7$, and $414_7$. The AND circuits $408_P$ and $408_7$ have the lead 416 as inputs as does the AND circuit 408; the AND circuit $412_7$ has the lead 420 as an input as does the AND circuit 412; and the AND circuits $414_P$ and $414_7$ have the lead 422 as an input as does the AND circuit 414. Likewise, although the AND and OR circuits 404, 408, 410 and 414 for the other bits are not illustrated, the corresponding bits are supplied from the buses 40, 43 and 44 to the AND circuits for these other bits that correspond with the AND circuits 408, 412 and 414 in the same manner as just described in connection with the AND circuits 408, 410, 412 and 414 and corresponding AND circuits for the three other bits that are illustrated.

The AND circuits 410, $410_P$ and $410_7$ have the signal "Gate LSR Low Crossed to A" on lead 418 applied to them, indicating that these AND circuits are concerned with the crossing of bits being supplied to the A register 19. The AND circuits 410 and $410_7$ respectively have the 4 and 3 bits from bus 43 supplied to them for this purpose; and the corresponding AND circuits $410_1$, $410_2$, $410_3$, $410_4$, $410_5$, and $410_6$ (not illustrated) would have bits 5, 6, 7, 0, 1 and 2 supplied to them in lieu of the 4 and 3 bits that are supplied to the AND circuits 410 and $410_7$ in order to accomplish this purpose.

The "gate CR to A" signal on lead 448 is applied when the contents of the condition register 26 are to be gated to the A register 19, and this signal allows the AND circuits 424, 426, 428, 430, 432, 434 and 436 to pass the signals "CR parity" on lead 346 and the other signals from the condition register 19 applicable to these AND circuits, if the latter signals from the condition register 26 exist. These signals are thus supplied to the bus 438 and thereby to the A register 19.

The "Gate LSR Low normal to A" and the "Gate LSR Hi to A" signals on leads 420 and 422 enable the AND circuits 412 and 414 for bit zero and the corresponding AND circuits for the other bits, so as to set the corresponding latches $L_{A1}$ to $L_{A9}$. The "Gate I/O Bus to A" signal causes a gating of the bits in bus 40 into the A register 19 in much the same manner. The signal "Gate LSR Low Crossed to A" functions in much the same manner as the signals just mentioned but results in an exchange of the high four bits of a byte with the low four bits of the byte. The "Misc Bit 3 to A", "Force Bit 7 to A" and "Force Bit 6 to A" signals are supplied for supplying these miscellaneous bits to the A register 19, and these signals function in connection with the AND and OR circuits previously mentioned to cause this storage of data in register 19. These miscellaneous bits consist of address modification factors, for example.

The CONDITION register in the preferred embodiment of the invention is a 6 bit wide register used to store discrete indicators of certain instruction results. Such registers are known in the art. Its output is fed to the A register for the purpose of program testing. The program test information may be contained in a data byte in the instruction stream in main storage 12. Such a data byte may be entered into the B register for the purpose of modifying it in the ALU by the contents of the CONDITION register which is in the A register. The output of the ALU will indicate whether the test is successful or not. The loading of the CONDITION register 26 may be from the ALU or the bits may be set individually by the CPU control circuitry as the result of a program execution. Thus, while the data flow chart of FIG. 1 shows a single input in the form of bus 42, it is understood by those skilled in the art that additional inputs thereto are provided from the CPU control logic.

The register 26 consists of a plurality of latches which are selectively set to indicate various machine conditions. For example, various operations of the CPU require that a test be made to determine that certain conditions are met. An example of such a test is whether a certain bit of a specified address in the main storage 12 is a logic 1. If the test results in a false that is, that the condition is not met, a latch in the CONDITION register will be set. This can be sensed by a later instruction. An example of another condition which can be tested by the CONDITION register is an indication that an ALU operation has resulted in an operand which is larger than the field length assigned to handle that operand. For example, if the ALU has effected a binary arithmetic operation and that operation has resulted in an operand larger than the field assigned to it, this will be indicated in the CONDITION register by the setting of a latch therein. The input to the CONDITION register 26 coupled to the bus 42 is used to initialize the register 26.

Referring to FIG. 17, the condition register 26 may be seen to comprise flip latches 290, 292, 294, 296 and 298. The latch 290 is a "Not Condition Register Equal" latch and has set and reset leads 300 and 302. The latch has an output lead 304, and an inverter circuit 306 is connected to lead 304 and has an output lead 308.

The latch 292 is a "CR LO/Not HI" latch and has set and reset leads 310 and 312. The output of the latch 292 is connected to an inverter circuit 314 which in turn is connected to an AND circuit 316 having an output lead 318. An AND circuit 320 is connected to the output of the latch 292 and has an output lead 322. The lead 304 is connected also to both of the AND circuits 316 and 320, as shown.

The latch 294 may be termed a "Condition Register Binary Overflow" latch and has set and reset leads 324 and 326 and an output lead 328. The latch 296 may be termed a "Condition Register Decimal Overflow" latch and has set and reset leads 320 and 332 and an output lead 334. The latch 298 may be termed a "Test False" latch and has set and reset leads 336 and 338 and an output lead 340.

An exclusive OR circuit 342 has its two inputs connected to leads 328 and 334 and has its output connected to a second exclusive OR circuit 344. The lead 340 constitutes the second input of exclusive OR circuit 344, and this circuit has the output lead 346.

Under the condition mentioned above in which a test results in a test false condition, the latch 298 has a signal applied to it from the lead 336 resulting in the signal on line 340 "CR test false". The signal level on line 340 may then be sensed by a later instruction applied to the machine. Decimal overflow is an indication that some decimal arithmetic operation has resulted in an operand and an answer that was larger than the field length assigned to handle it, and binary overflow is similar for a binary operation. In these cases, signals are supplied to the leads 324 and 330 respectively setting the latches 296 and 294 and providing the signals "CR decimal overflow" and "CR binary overflow" on leads 334 and 328.

The latches 290 and 292 function together and result in displaying three conditions. If the condition of the condition register is not equal, that is, if the two last operands operated on by the machine were not equal; these operands are either high or low; and the latches 290 and 292, in conjunction with the AND circuits 316 and 320 indicate these two conditions by providing signals on lines 318 and 322. If the operands are equal, these circuits will supply a signal on lead 308, and no signal will be supplied on lead 300 to the latch 290 for setting this latch. Obviously, an equal condition is mutually exclusive with respect to high and low conditions; and, therefore, latch 290 is set by means of a signal on lead 300 only when a not equal condition exists, so that in this case AND circuits 316 and 320 may be satisfied. One of the AND circuits 316 and 320 is enabled for a latched condition of latch 292, while the other is satisfied for an unlatched condition of this latch, as is apparent.

The exclusive OR circuits 342 and 344 constitute a parity generator, and the reason for this is that the data in the condition register 26 is taken by means of the A register 19 through the ALU 18 and back to main storage 12 for use by the program to determine the present status of various operations. Parity generation as therefore provided by the condition register thus is capable of supplying good parity to the A register 19 when this data is moved back into storage 12.

The storage data register (SDR) 14, actually a portion of the main storage, is a buffer register for the data which flows into and out of the main storage 12. This register is a 9 bit wide register receiving an 8 bit byte plus parity. Data may be placed in the register 14 by bus 42 from the ALU output during each machine cycle. Similarly, during each machine cycle, data from the register 14 when intended for the CPU enters the CPU via bus 39 and is stored initially in the B register.

The OP register stores the OP codes of the CPU. This register is 9 bits wide, storing an 8 bit plus parity OP code. On command from the control section 31 an OP code is sent to the register 28 from the main storage 12 through the register 14, the B register 17, and ALU 18. The decoding of the code in the OP register is performed by decoder 29. The output of the decoder 29 is fed to the CPU controls 31 which accomplish the necessary timing to carry out the instructions. Though not shown in the data flow diagram of FIG. 1, it is understood by those skilled in the art that various timing lines originate in control 31 and are connected to various units within the CPU to transmit the necessary timing pulses.

The Q register 30 is used to store a portion of the instruction known as the Q byte. The Q byte serves generally to extend or modify the OP code. During execution of an instruction the Q byte is stored in this register and decoded in decoder 27.

Local Store Registers

Figure 5:
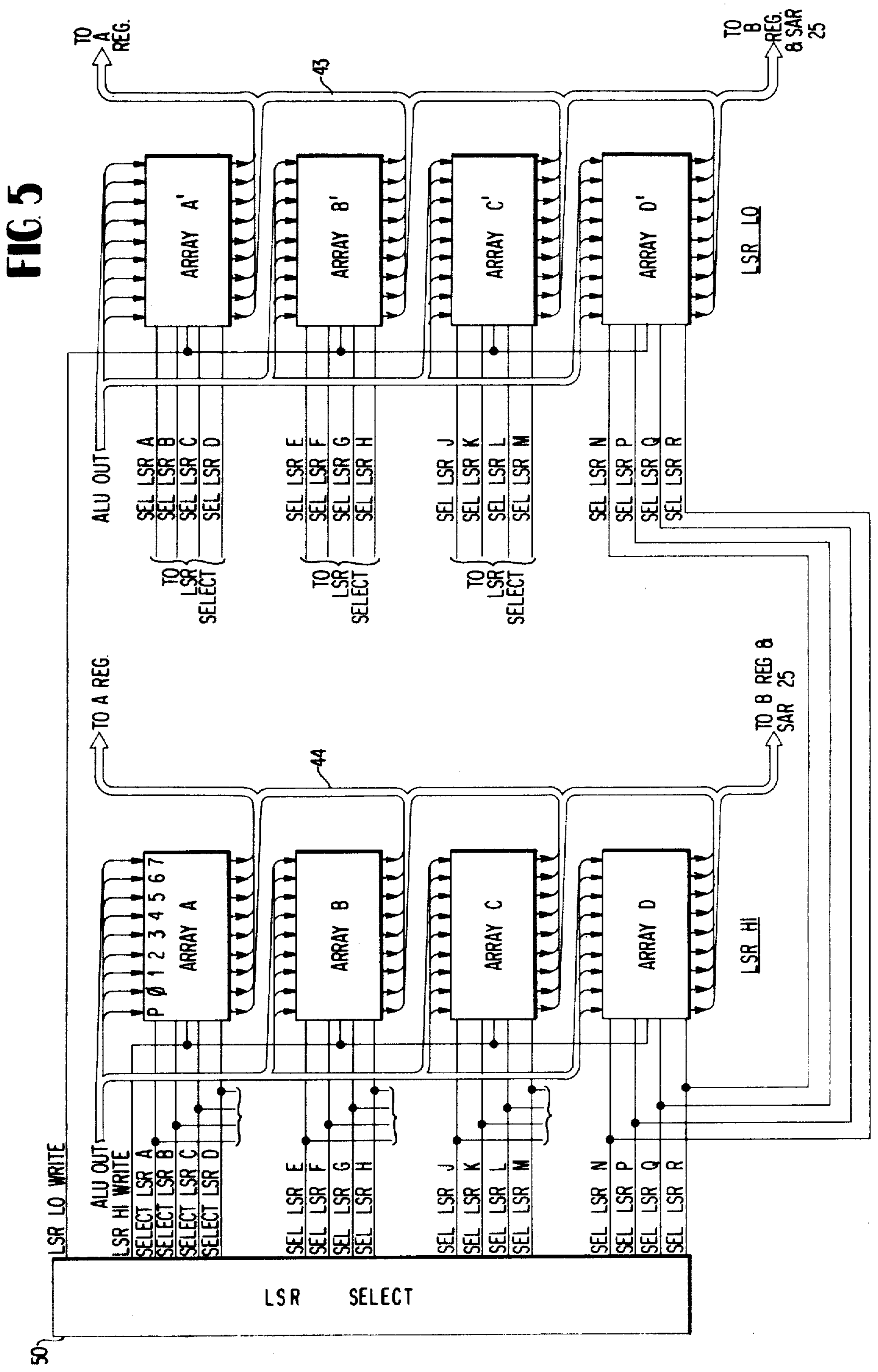
FIG. 5 shows the arrangement of the local store registers of this invention.

The preferred arrangement of the local store registers (LSR) 24 is shown in FIG. 5. These registers each 18 bits wide, are grouped in arrays, A–D, each comprising four registers. Each of the registers is divided into a HI half and a LO half. An LSR HI WRITE and a LSR LO WRITE line is provided for the HI and LO halves of each register respectively for enabling the selected entry of data into either the HI or LO half of the register from the ALU. These registers serve various purposes such as acting as address registers for the storage 12 and as temporary storage means during a cycle. Examples of specific local store registers are as follows.

One may be an INSTRUCTION ADDRESS register for storing the address of a location in the storage 12 of an instruction byte in the instruction stream of a program under operation. Another may be an A ADDRESS register. This register is used for fetching an A factor of data which will be used in the A register to modify the contents of the B register. Additionally, the registers 24 may contain INDEX registers which allow for address modification of the address in an instruction stream as will be described. Further, the registers may also contain a DATA RECALL register which functions as a temporary storage area. Other registers act as address registers for such a peripheral devices as a printer, and a multifunction card unit.

During clock time 0 an INSTRUCTION ADDRESS register is selected by means of the LSR selection circuit 50 shown generally in FIG. 5. As is known in the art, such a circuit comprises gating circuits for logically combining instruction and timing signals for selectively energizing a SEL LSR and LSR HI WRITE or LSR LO WRITE line. When an LSR is selected, its contents may be transferred to the register 25 via buses 43 and 44. Such a transfer occurs during raising of the LOAD SAR line as previously explained.

During each machine cycle the address in the selected LSR address register must be updated. This occurs during clock times 5 through 8. Since an address is two bytes wide, thus filling the entire 18 bits of the selected LSR, modification must occur in two parts since the CPU can operate on only one byte during each machine cycle. Thus, during clock times 5 and 6, the LO half of a selected LSR is operated upon. Modification of the LO half is accomplished by transferring the address byte in the register via bus 43 into the B register and an appropriate modification factor into the A register. The contents of the A and B registers are gated into the ALU 18 and there the contents of the B register is incremented or decremented by the modification factor contained in the A register. The use of the ALU as a means of modifying the B register contents allows for address increments of other than plus or minus 1. The plus or minus 1 increment is the limit of address modification in CPUs which use computers for the address modification.

At clock times 7 and 8, the HI portion of the selected LSR is modified in the same manner as was the LO portion.

In addition to the time period corresponding to clock times 5 through 8, the contents of the LSRs 24 can be modified at other times. The LSR WRITE line a timing diagram of FIG. 2 indicates by the dotted pulses the other times during which the contents of the LSRs can be modified. Thus, the dotted pulse substantially on the clock time 2 indicates, that at this time also, the contents of one half of a selected LSR may be varied depending upon the particular instruction which is controlling CPU operation.

The uppermost four local store registers 24, which may be the instruction address register, the A address register, the B address register, and one of the index registers, for example, are formed by arrays A and A' shown in FIG. 5, array A containing the left half of each of these local store registers and array A' containing the right half of each of these local store registers. For the purpose of more specific illustration, FIG. 12 shows array A in more detail; and, it will be understood that the other arrays shown in FIG. 5 have substantially the same construction.

Figure 12:
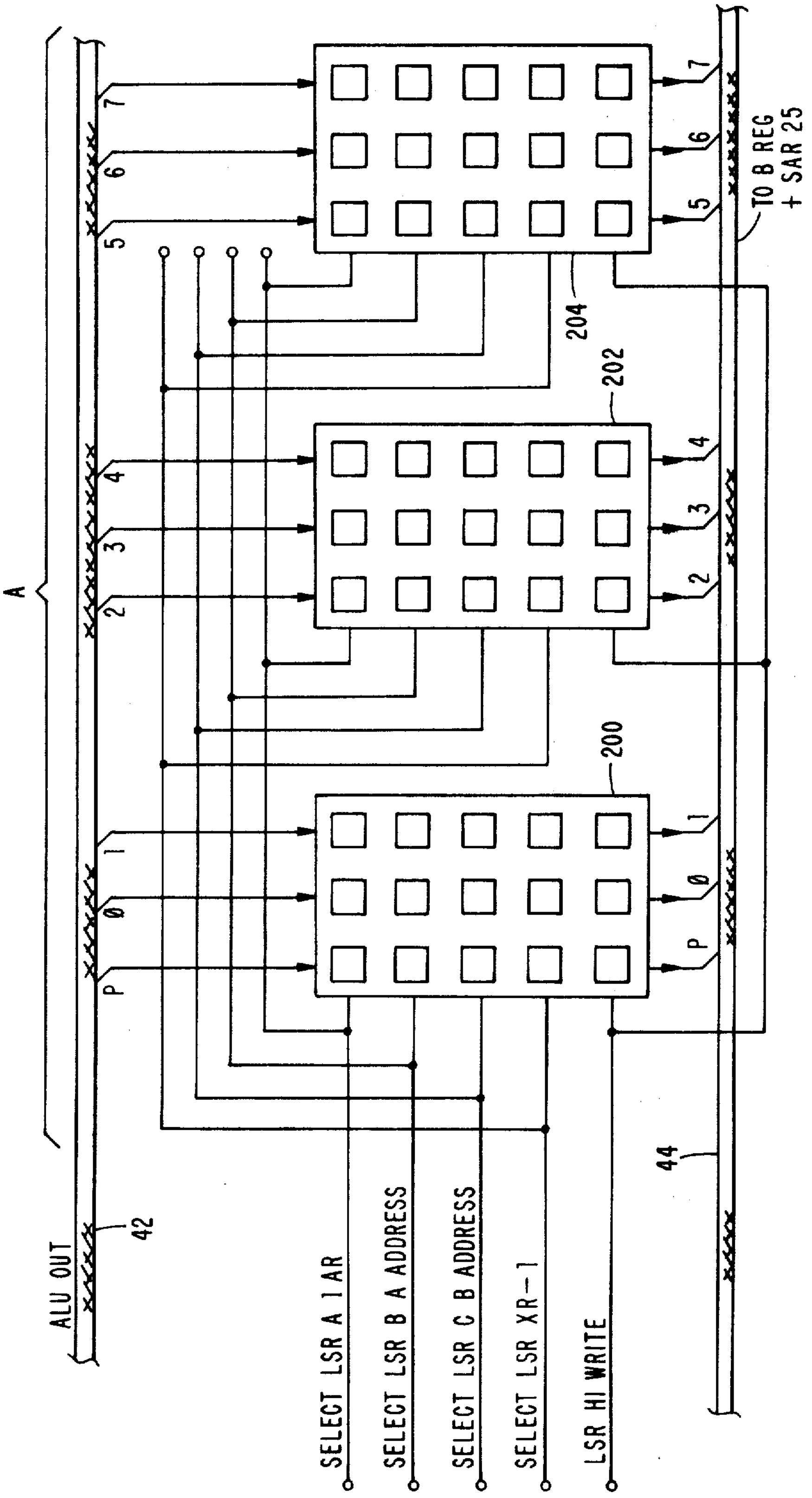
FIG. 12 is a diagrammatic illustration of the halves of four local store registers.

Referring to FIG. 12, array A may be seen to comprise modules 200, 202, and 204; and, as will be observed, the select LSR A, B, C, and D lines are select lines for the instruction address register, the A address register, the B address register, and the index register. The LSR HI Write line is applied to each of the modules 200, 202, and 204, as shown. The bus 42 is connected to each of the modules 200, 202 and 204 supplying information from the ALU 18; and the modules 200, 202 and 204 are connected with the bus 44, which in turn is connected with the B register 17 and the SAR 25 for supplying information to the latter.

Figure 13:
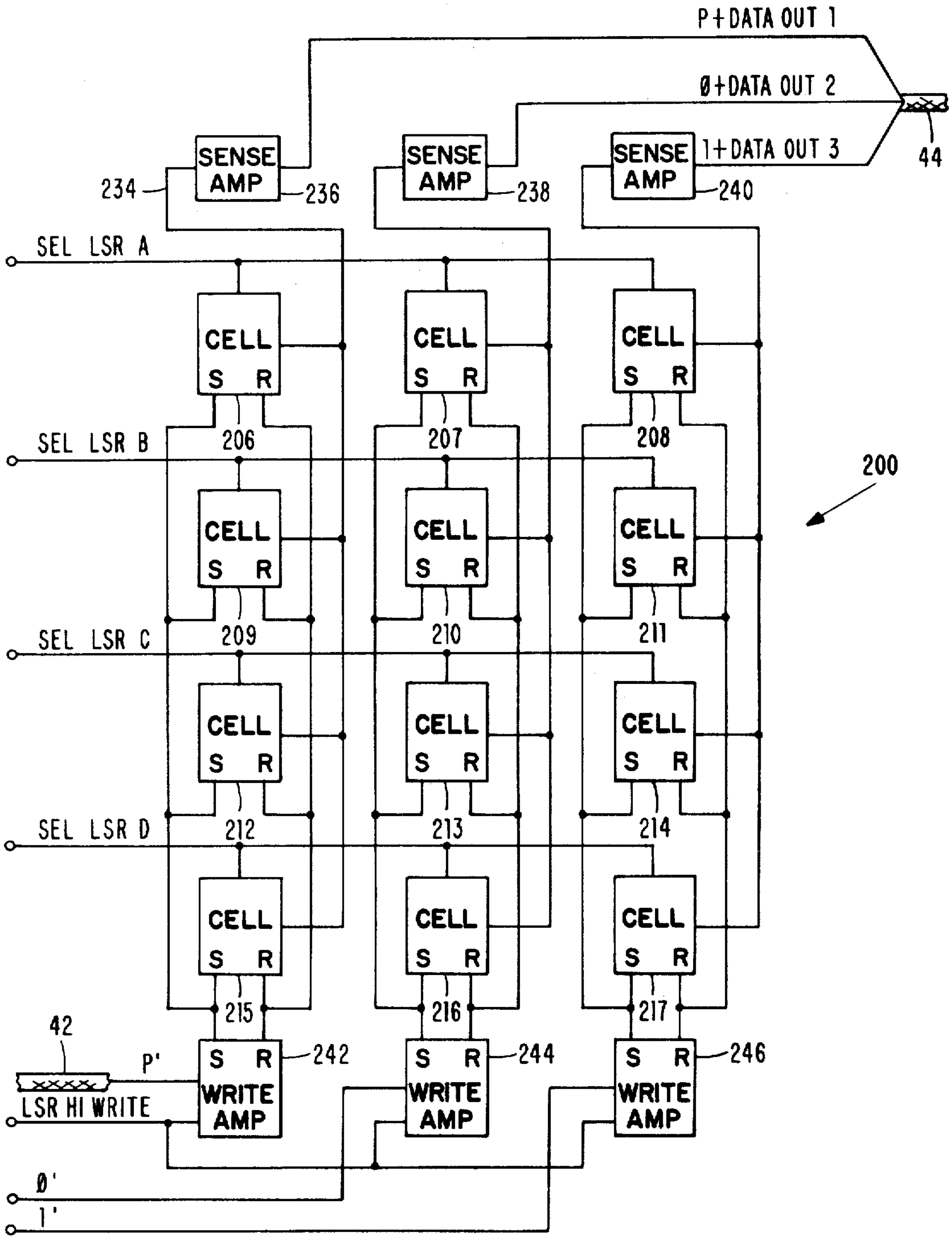
FIG. 13 is a diagrammatic illustration of three bits of the four local store registers and including a cell for each bit.

The modules 200, 202 and 204 are of similar construction, and the module 200 is illustrated diagrammatically in FIG. 13. Referring to this figure, the module 200 may be seen to comprise cells 200 to 217, with cells 206 to 208 forming a part of the instruction address register, cells 209 to 211 forming a part of the A address register, cells 212 to 214 forming a part of the B address register, and cells 215 to 217 forming a part of the index register.

Figure 14:
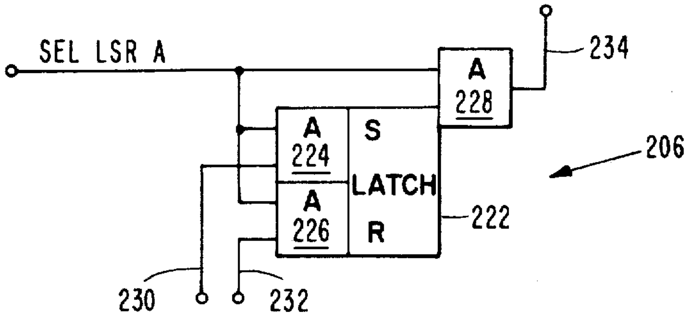
FIG. 14 is a diagrammatic illustration of one of these cells.

The cells 206 to 217 are identical, and FIG. 14 specifically shows the makeup of cell 206. Referring to this figure, cell 206 may be seen to comprise a latch 222 having an AND circuit 224 appended on its set side and an AND circuit 226 appended on its reset side. An AND circuit 228 is at the output of the latch 222. The AND circuits 224 and 226, respectively, have the set lead 230 and the reset lead 232 as inputs, and the select LSR A lead is also applied to both of these AND circuits as an input. The AND circuit 228 has the output of the latch 222 as an input in addition to the select LSR A lead, and the output of the AND circuit 228 is the lead 234.

Referring to FIG. 13, the module 200 may be seen to comprise sense amplifiers 236, 238 and 240 and write amplifiers 242, 244 and 246. The sense amplifier 236 is connected to the output lead 234 of the cell 206 and also with the "P" lead in the bus 44. The write amplifier 242 is connected with the "P'" line in the bus 42 and also with the LSR HI write line, as shown. The amplifier 242 has set and reset terminals which are respectively connected with the set and reset leads 230 and 232 for the cell 206. The cells 209, 212 and 215 have substantially the same connections with the amplifiers 236 and 242 as the cell 206; and the cells 209, 212 and 215 respectively have the select LSR B, the select LSR C, and the select LSR D leads as controlling inputs, as shown.

The cells 207, 210, 213 and 216 have substantially the same connections with respect to the amplifiers 238 and 244 as the cells 206, 209, 212 and 215; and the cells 208, 211, 214 and 217 have similar connections with the amplifiers 240 and 246.

The basic function of the local store registers is to receive data, to hold this data and to finally discharge this data therefrom, the data being received from bus 42 and discharging into buses 43 and 44. If the local store register A (the instruction address register in the particular example given) has data being loaded into it, the LSR HI Write line and the LSR LO Write line have signals on them, while bits are present on the corresponding lines of the bus 42, such as the P', 0' and 1' lines in bus 42. In addition, the select line for the particular LSR being loaded, in this case the LSR A (for the instruction address register) has a signal on it. If the particular bit corresponding to a particular cell 206–217 is present in the bus 42, the corresponding write amplifier, such as the amplifier 242, will provide a set signal as an output. Assuming that the P' bit exists in the bus 42, the write amplifier 242 will output such a signal so that the latch 222 is set (see FIG. 14). The LSR A register may then be read, using the sense amplifier 236 and the other corresponding sense amplifiers, together with the corresponding lines of the bus 44. The output AND circuit 228 of the latch 222 of cell 206 is effective to provide an output whenever the corresponding select LSR A line has a signal on it, assuming that the latch 222 has previously been set. The same is true insofar as providing an output from any of the other cells making up the particular local store register, the contents of which are being read.

Arithmetic and Logic Unit

The arithmetic and logic unit may be any well known unit capable of acting arithmetically and logically on two 8 bit plus parity data bytes and supplying a single 8 bit plus parity byte at its output. One such arithmetic and logic unit, which may be used with the CPU of this invention, is disclosed in FIG. 7 of copending application, Ser. No. 832,684, filed July 12, 1969 and assigned to the same assignee as the present invention. This application has resulted in Mitrofanoff U.S. Pat. No. 3,596,074, issued July 27, 1971. In the computer shown in FIG. 7 of this patent, the ALU corresponds to the ALU 18 herein; the register 10 of the patent contains base data and corresponds to the B register 17 herein; the register 11 of the patent contains modifying data and corresponds to the A Register 19 herein; and the controls 15 of the patent correspond to the controls 31 herein.

CPU Operation During an Instruction

The following is a description of the operation of the CPU during a particular instruction.

Before developing CPU operation according to a specific instruction, instruction formats used with the CPU will be described. Instructions may be three, four, five, or six bytes in length, recalling that the base unit of data for the system is one byte equal in length to 8 bits plus parity. Selection of an instruction length will depend on the type of instruction and the address mode.

Either one or two address modes may be used. The instruction formats for each of the address modes are detailed in FIG. 6.

Figure 6:
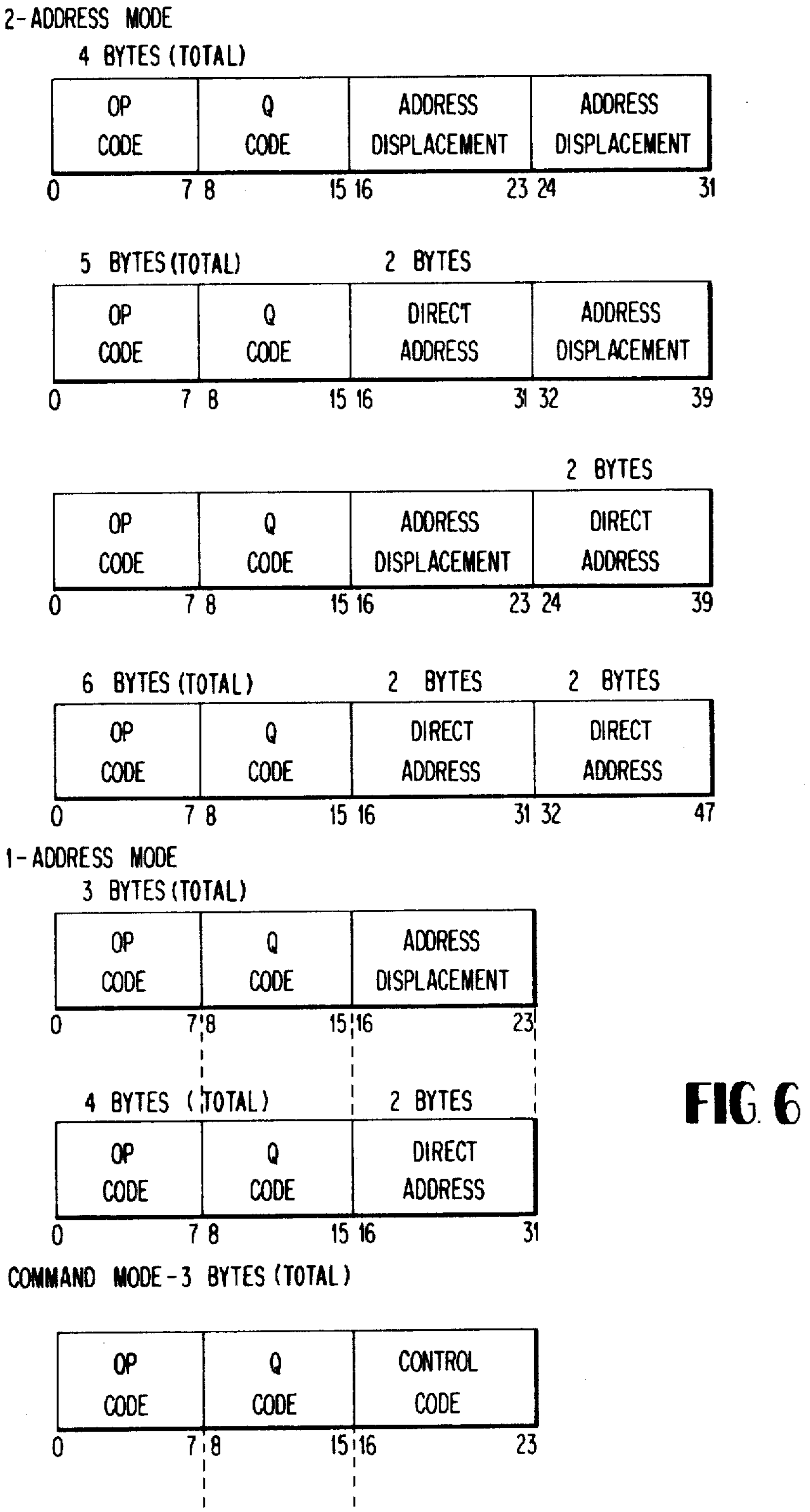
FIG. 6 is a chart of instruction formats which may be used with the CPU of this invention.

The first byte of each instruction contains the OP code. This code indicates the instruction the CPU is to follow. FIG. 7 lists 28 instructions which the machine may carry out. It is understood, however, that this list is given as an example only and the teaching of the invention not limited thereto. For each of the instructions, there is indicated its OP code in the form of an alphanumeric designation, the first letter of which is either an X, Y, Z or F. This first letter indicates a four bit code, 0–3, which specifies the addressing mode to be employed by the instruction. The first two bits 0–1 indicates the mode of a first operand address and while the second, the mode of a second operand address if one exists. FIG. 8 indicates the possible conditions of bits 0–3 and their significance. Using the convention set forth in FIG. 8, an X indicates a two-address mode while both Y and Z indicate a one-address mode. The corresponding instruction formats are shown in FIG. 6.

Direct addressing is indicated when the appropriate pair of OP bits are both zero. When direct addressing is employed, the address in the instruction is two bytes long and refers directly to storage locations in the main storage 12.

Index or displacement addressing is indicated by a one bit in either, but not both, positions of the appropriate pair of bits. A one bit in both positions in a pair indicates no operand address. Such a condition would result when the CPU is to operate in a COMMAND mode. Index addressing indicates that the address in the program instruction stream is to be modified by the contents of an INDEX register. For this purpose, two 16 bit INDEX registers, denoted XR1 and XR2, in FIG. 8 are provided in the local store registers 24. The specific register is selected by the position of the 1 bit in the specified pair. The contents of the selected INDEX register is added to an 8 bit displacement from the instruction to generate the effective 16 bit address.

The second four bits in the OP code indicate the operation to be performed. The setting of these bits, bits 4–7, for each of the 28 instructions is indicated in FIG. 7. In this manner, the 8-bit OP code uniquely defines the instruction and the addressing mode to be used in retrieving the operand addresses.

The second byte of each instruction is the Q code. Depending on the operation specified by the OP code, the Q code may represent a length count, a register address, or other function depending upon the instruction format. For example, for a Y4 format, that is a STORE REGISTER instruction, the contents of a local store register as specified by the contents of the Q code are placed in the storage locations specified by a first operand address.

The remainder of the instruction will be either a first operand address or first and second operand addresses or an address to which a branch is made or a control code.

To carry out each of the instructions requires a multiplicity of machine cycles. As previously explained, a machine cycle consists of nine clock times. As indicated in FIG. 6, the length of an instruction may vary from three to six bytes and the execution of the operation is also variable in length. Therefore, the number of machine cycles required to carry out an instruction vary considerably with the different instruction. Basically, the CPU processes two types of cycles; the instruction cycles wherein the instruction is retrieved from the storage 12, and the execution cycles during which time the instruction is carried out. FIG. 9 illustrates nine instruction cycles and two execution cycles, while FIG. 10 illustrates the time sequence of the occurrence of these cycles.

As an example of the data flow through the CPU in carrying out an instruction, a SUBTRACT LOGICAL instruction will be described. This instruction is indicated by an OP code XF. It will be assumed that both the operand 1 and operand 2 are two bytes long.

Figures 10, 11:
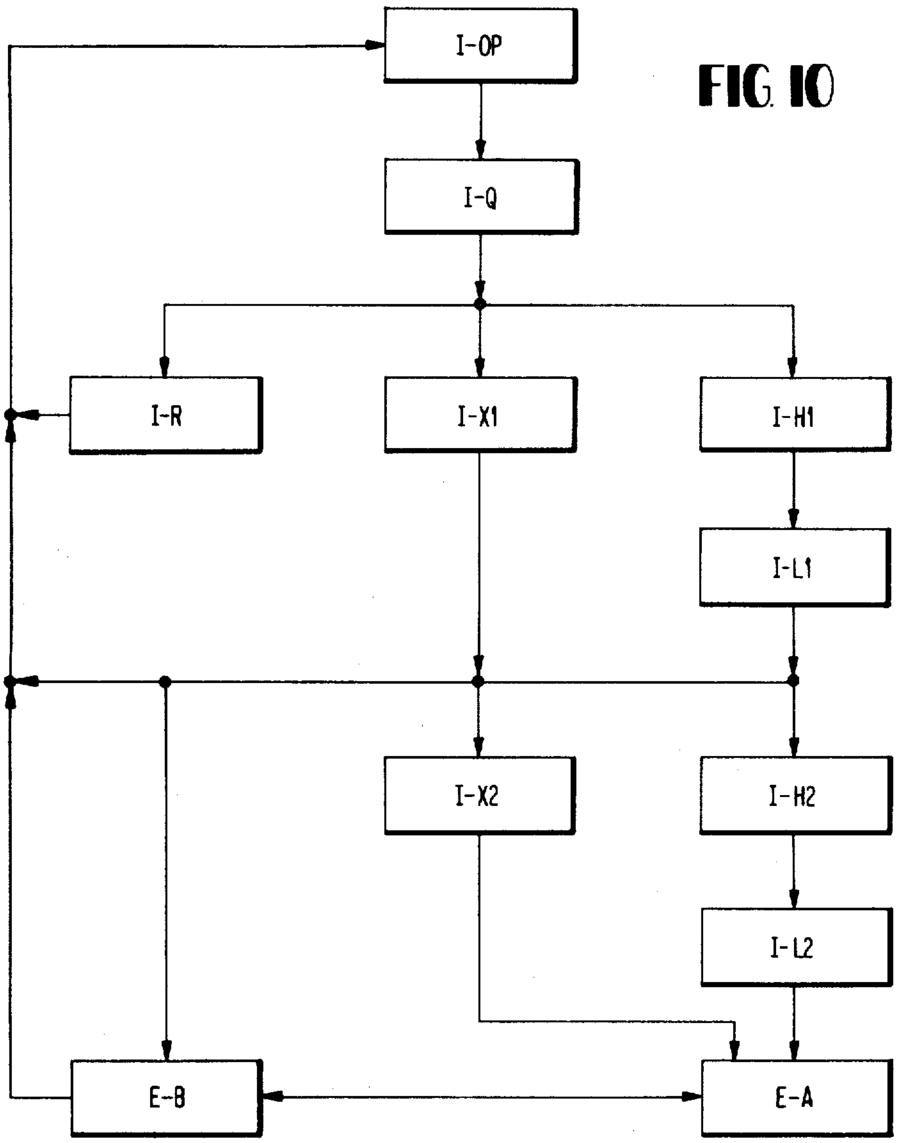
FIG. 10 is a flow diagram showing the order of occurrence of the machine cycles.
FIG. 11 is an instruction format for a Subtract Logical instruction.

FIG. 11 shows the instruction format for carrying out the SUBTRACT LOGICAL instruction. The XF section of the instruction is the OP code previously described, while the L portion or length count is the Q code, also previously described. In the instruction shown, the second operand is to be subtracted byte by byte from the first operand and the result placed in the first operand location.

The XF OP code indicates that the instruction is a SUBTRACT LOGICAL. The X indicates that a two address mode is used while the F indicates that the subtract logical instruction is to be performed. For the purpose of this example, let it be assumed that the first and second addresses are direct addresses, thus they are contained in the instruction stream. This is indicated in the OP code by setting bits 0–3 to 0000. Let it also be assumed that the length count is two. The L in the Q code is defined for this instruction as one less than the length count of the operand bytes. Therefore L will be equal to 1. To carry out this instruction will therefore require ten machine cycles, each one of which is dealt with individually below.

Machine cycle 1 — Starting at clock time zero, an INSTRUCTION ADDRESS register in the LSRs 24 will be selected to determine the starting address of the instruction. It will contain the address in the main storage 12 wherein is stored the OP code XF. At clock time 0 of the machine cycle 1, the contents of the selected INSTRUCTION ADDRESS register is loaded into register 25. At clock time 1, readout from storage 12 is requested. Clock times 1 and 2 (MISCELLANEOUS) will be wasted during this machine cycle. During clock times 3 and 4, the code XF will have arrived from the memory into register 14 and is sent unmodified to the OP register 28 via the B register and ALU. At clock time 5, a write request is made to write XF from register 14 back into storage 12. During the functional time period ADDRESS LO MOD, i.e. clock times 5 and 6, the address in the LO half of the INSTRUCTION ADDRESS register will be put into the B register and a modification factor of one placed into the A register. The contents of the A and B registers are then transferred to the ALU where the contents of the A register is added to that of the B register. In this manner, the LSR LO address is incremented by a 1. The contents of the ALU is then transferred by way of bus 42 back into the LO portion of the INSTRUCTION ADDRESS register. During the functional time period, ADDRESS HI MOD, clock times 7 and 8, the LSR HI byte of the address is transferred to the B register and a carry, if any resulted from the addition during clock times 5–6, sent to the A register. The contents of the A and B registers are then transferred to the ALU and a binary addition effected. The contents of the ALU is then transferred by way of bus 42 back into the HI portion of the INSTRUCTION ADDRESS register. This completes machine cycle 1.

Machine cycle 2 — During this machine cycle, the byte of data labeled L which is located in the storage 12 is retrieved. The L byte, which is the Q byte, will contain the length of the operand fields. By having incremented the INSTRUCTION ADDRESS register its contents now points to the address in storage 12 containing the Q byte. At clock time 0 of machine cycle 2 the INSTRUCTION ADDRESS register in the LSR 24 is selected and its contents loaded into register 25. The data contained at the addressed location in the storage 12 is read out to the storage data register 14. Again, the clock times 1–2 are wasted. During the COMPUTE period, clock times 3 and 4, the data indicating the length of the operand fields will be available from the memory and will go through the ALU to the Q register 30 and into a LENGTH COUNT register located in LSR 24. The data in the Q register will then be decoded in decoder 27. The address in the INSTRUCTION ADDRESS register will have to be updated once again. Thus, at clock times 5–6 of machine cycle 2, the content of the LO half of the register is transferred to the B register while a modification factor of 1 is entered into the A register. The contents of the A and B registers are again transferred to the ALU where they are modified and transferred by means of bus 42 back to the LO half of the INSTRUCTION register. Similarly, during clock times 7 and 8, the HI half of the register is updated.

Machine cycles 3 and 4 — During these cycles, the operand 1 address will be developed. Two cycles are needed since the operand address has been assumed to be two bytes in length. If the operand address was one byte in length, then only one cycle would be needed. The storage 12 is again addressed from the INSTRUCTION ADDRESS register which is now, due to its updating during cycle 2, pointing to a storage location containing the first byte of the operand 1 address. Again, functional time period MISCELLANEOUS (clocks 1 and 2) is unused. During the COMPUTE period, the portion of the operand 1 address retrieved from the storage 12 will be transferred from the storage data register 14 through the B register and the ALU into the HI byte of a local store register called the B ADDRESS register (BAR). This register is used to store the address of the data which will be used in the B register. During functional times, ADDRESS LO MOD and ADDRESS HI MOD, the contents of the INSTRUCTION ADDRESS register is incremented by one as previously explained.

During machine cycle 4, the storage location in main storage 12 containing the second byte of the operand 1 address is accessed through the register 25 and the contents thereof read into the register 14. During the COMPUTE time, this data is transferred to the B register and through the ALU into the LO half of the BAR register where it is stored. At this point, there is a complete two byte address in this BAR register which has been fetched from the memory on two successive machine cycles. Again, the contents of the INSTRUC- TION ADDRESS register is modified during the clocks 5–8.

Machine cycles 5 and 6 — These cycles will be used to fetch the operand 2 address which is also two bytes long. These bytes are retrieved in the same manner as the operand 1 address bytes. However, the two bytes will be stored in a local store register called the A ADDRESS register (AAR).

Machine cycle 7 — This machine cycle is the first execution cycle. During clock time zero, the A ADDRESS register is selected. It contains the address of the low order byte of operand 2 which is loaded into register 25. During the COMPUTE time, clock times 3–4, clock times 1–2 being idle time once again, the low order byte of operand 2 is presented to the B register and sent directly through the ALU unmodified to a local store register which is used as a temporary storage means. This register has been denoted previously as the DATA RECALL register. During clocks 5–8, the address in the A ADDRESS register is modified by minus 1 to indicate the location in storage 12 of the high order byte of the operand 2.

Machine cycle 8 — This is a second execution cycle and, at clock time 0, the B ADDRESS register is selected and its contents loaded into the register 25. During machine cycle 8, clock times 1–2, are used to bring out the 1 which has been previously stored in the LENGTH COUNT register in LSR 24 into the B register. The length count in the B register is decremented by 1 in the ALU during the operand 1 execution cycles except during the first operand 1 execution cycle. The circuitry in controls 31 is such as to cause this operation. The output of the ALU, which in this case is 1, is then transferred via bus 42 into the Q register and back into the LENGTH COUNT register. During the COMPUTE time period the low order byte of operand 1, the address thereof being indicated by the contents of register 25, is now available in the B register. The low order byte of operand 2, which was previously stored in the DATA RECALL register of the local store registers 24, is put into the A register and the logical subtraction function is accomplished in the ALU. During time clock 5, the memory is instructed to destroy the low order operand 1 byte which has been fetched and stored in the storage data register 14 and replace it through register 14 with the output of the ALU which now contains the result of the subtraction. At clock times 5 through 8, the operand 1 address in the B ADDRESS register will be modified by minus 1 to indicate the address of the high order byte of operand 1.

Machine cycle 9 — At the end of machine cycle 8, a subtract instruction has been executed on the low order byte of the two operands. During machine cycle 9, the address in the A ADDRESS register signifying the location of the high order byte of operand 2 will be selected and the high order byte caused to pass through the B register and the ALU to the DATA RECALL register within the LSRs 24.

Machine cycle 10 — At clock time zero, the operand 1 address contained in the B ADDRESS register is loaded into the address register 25 to access the memory at this address. Miscellaneous clock times 1 and 2 will again be used during this cycle. During clock times 1–2, the contents of the LENGTH COUNT register will again be brought in for decrementing. The B register will again be loaded with a 1 and decremented in the ALU. The output of the ALU, which will be 0 is again transferred via bus 42 into the LENGTH COUNT and Q registers. The Q decode 27 will indicate a 0 which the control section 31 will recognize as the last cycle of this operation. During the COMPUTE period 3–4, the high byte of the operand 1 is available from storage 12. The corresponding high byte of operand 2 which was stored in the DATA RECALL register during cycle 9 is brought to the A register. The contents of the A and B register are transferred to the ALU where a subtraction is performed. Again, the memory is instructed to replace the contents in the register 14, with the value that is appearing on bus 42 as the output of the ALU.

While the invention has been particularly shown and described with reference to a preferred embodiment thereof, it will be understood by those skilled in the art that various changes in form and details may be made therein without departing from the spirit and scope of the invention.

We claim:

1. Computing apparatus operating in a succession of time intervals called machine cycles, comprising:

a single arithmetic and logic unit (ALU) having first and second inputs and constructed to modify a quantity supplied to said first input according to a quantity supplied to said second input, a main storage constructed to hold data including operands and instructions in different addressable locations therein, an instruction address local store register for holding the address of an instruction in said main storage, an instruction receiving register, means for transferring an instruction at the address contained in said instruction address local store register from said main storage to said instruction receiving register, means for supplying the address content of said instruction address register to said first input and means for supplying a modifying factor to said second input whereby said ALU may provide the address of a first operand in said main storage during one machine cycle, means for supplying said first operand from its said address in said main storage to said first input, means for supplying a second operand from said storage to said second input, and means controlling said ALU in accordance with said instruction in said instruction receiving register whereby said ALU produces the result of a mathematical modification of said first operand by said second operand during another machine cycle, said means for transferring an instruction and said means for supplying said first operand including a B register connected to receive said instruction from said local store register and to receive said first operand from said main storage and to supply these to said first input of said ALU, said ALU being constructed to modify a quantity as aforesaid and also being constructed so as to flush said instruction directly therethrough without change to said instruction receiving register.

2. Computing apparatus as set forth in claim 1 and including a storage address register connected to receive said address content of said instruction address local store register and connected with said main storage so as to address different addressable locations therein, said local store register and said storage address register each having a bit capacity which is a plurality of times the bit capacity of said ALU and said means for supplying the address content of said instruction address register to said first input being effective for doing so in a plurality of steps respectively directed to parts of the address as held by said local store register.

3. Computing apparatus operating in a succession of time intervals called machine cycles comprising:

a single arithmetic and logic unit (ALU) having first and second inputs and constructed to modify a quantity supplied to said first input according to a quantity supplied to said second input, a main storage constructed to hold data including operands and instructions in different addressable locations therein, an instruction address local store register for holding the address of an instruction in said main storage, an instruction receiving register, means for transferring an instruction at the address contained in said instruction address local store register from said main storage to said instruction receiving register, means for supplying the address content of said instruction address register to said first input and means for supplying a modifying factor to said second input whereby said ALU may provide the address of a first operand in said main storage during one machine cycle, means for supplying said first operand from its said address in said main storage to said first input, means for supplying a second operand from said storage to said second input, and means controlling said ALU in accordance with said instruction in said instruction receiving register whereby said ALU produces the result of a mathematical modification of said first operand by said second operand during another machine cycle, said computing apparatus including a storage address register connected to receive said address content of said local store register, a decoder connected to receive the address from said storage address register and to thereby select a position in said main storage corresponding to said address, said means for transferring an instruction and said means for supplying said first operand including a B register connected to receive said first operand from said main storage and to receive said instruction from said local store register and connected to supply said first operand and said instruction to said first input of said ALU, said means for supplying a modifying factor and said means for supplying said second operand including an A register for holding said modifying factor and said second operand and connected with said second input of said ALU so as to provide said modifying factor and said second operand thereto.

4. Computing apparatus as set forth in claim 3, wherein said computing apparatus also includes a B address local store register and an A address local store register for respectively holding the addresses of said first and second operands from said main storage and said means for supplying said first and second operands including means for supplying the addresses in storage of said first and second operands respectively to said B address and said A address local store registers before said operands are supplied to said inputs.

5. Computing apparatus as set forth in claim 4 and including a data recall local store register connected to temporarily hold said second operand and to deliver said second operand to said A register.

6. Computing apparatus as set forth in claim 4, said local store registers and said storage address register each having a bit capacity which is twice the bit capacity of said A and B registers and ALU and said means for supplying the address content of said instruction address register and for supplying said operands including means for utilizing only one-half of the contents of said local store registers at a time.

* * * * *